United States Patent [19]

Murakami et al.

[11] Patent Number: 4,710,812
[45] Date of Patent: Dec. 1, 1987

[54] INTERFRAME ADAPTIVE VECTOR QUANTIZATION ENCODING APPARATUS AND VIDEO ENCODING TRANSMISSION APPARATUS

[75] Inventors: Tokumichi Murakami; Atsushi Itoh; Kohtaro Asai; Koh Kamizawa; Masami Nishida, all of Kanagawa, Japan

[73] Assignee: Mitsubishi Denki Kabushiki Kaisha, Tokyo, Japan

[21] Appl. No.: 833,269

[22] Filed: Feb. 28, 1986

[30] Foreign Application Priority Data

Feb. 28, 1985 [JP] Japan .................................. 60-39351
Mar. 8, 1985 [JP] Japan .................................. 60-46120
Apr. 5, 1985 [JP] Japan .................................. 60-72094
Apr. 12, 1985 [JP] Japan .................................. 60-77741
Sep. 30, 1985 [JP] Japan ................................. 60-217320

[51] Int. Cl.$^4$ ............................................. H04N 7/12
[52] U.S. Cl. ...................................... 358/136; 358/134
[58] Field of Search .......... 358/11, 105, 133, 134–136, 358/180–182; 375/27

[56] References Cited

U.S. PATENT DOCUMENTS

| 4,292,652 | 9/1981 | Yumde et al. ......................... 338/134 |
| 4,316,222 | 2/1982 | Subramaniam ....................... 358/261 |
| 4,460,923 | 7/1984 | Hirano et al. ......................... 358/136 |
| 4,494,141 | 1/1985 | Altekruse ............................. 358/134 |
| 4,558,350 | 12/1985 | Murakami ............................ 358/133 |
| 4,560,977 | 12/1985 | Murakami et al. ................... 364/807 |
| 4,591,909 | 5/1986 | Kuroda et al. ....................... 358/136 |

FOREIGN PATENT DOCUMENTS

| 20097858 | 1/1984 | European Pat. Off. . |
| 59-34781 | 6/1984 | Japan . |
| 2003001 | 2/1979 | United Kingdom . |
| 2144299 | 2/1985 | United Kingdom . |

OTHER PUBLICATIONS

Y. Linde et al., "An Algorithm for Vector Quantizer Design", IEEE Trans., 1980, COM-28, pp. 84–95.
A. Gersho, "On the Structure of Vector Quantizers", IEEE Trans., 1982, LT-28, pp. 157–166.
A. Buzo et al., "Speech Coding Based Upon Vector Quantization", IEEE Trans., 1980, ASSP-28, pp. 562–574.

Primary Examiner—Howard W. Britton
Assistant Examiner—John K. Peng
Attorney, Agent, or Firm—Bernard, Rothwell & Brown

[57] ABSTRACT

In an interframe adaptive quantization encoding apparatus to perform efficient encoding of video signals using vector quantization method, analog signals raster-scanned from the left to the right on the screen and from the upper side to the lower side are converted into digital signals, the digital signals per every m picture elements x n lines are made a block and the block data is subjected to mean value separation in a vector quantization encoder thereby input vector is formed, inner product between the input vector and output vector read from a code book ROM is estimated by an inner product operation circuit, and maximum value of the inner product is estimated by a maximum inner product detection circuit and made amplitude coefficient, thereby efficient encoding is performed. The efficient encoding data is transmitted to the transmission path by a transmission data buffer and at the same time threshold value of movement detection in the vector quantization encoding is controlled by a movement detection control circuit, and the encoding data supplied from the vector quantizer is decoded by a vector quantization decoder and the block data is reproduced, thereby the apparatus can be constituted without increasing the circuit scale.

9 Claims, 24 Drawing Figures

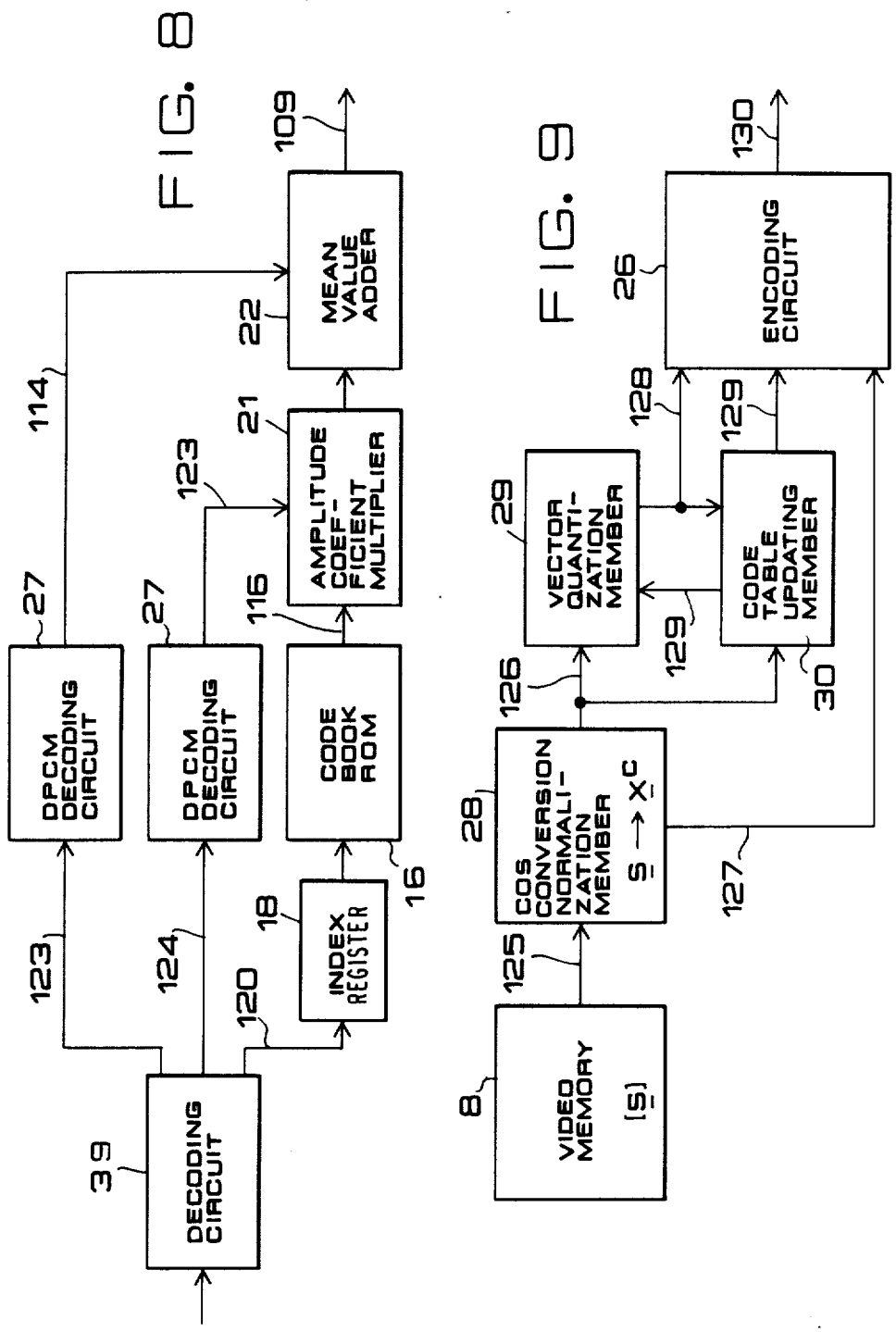

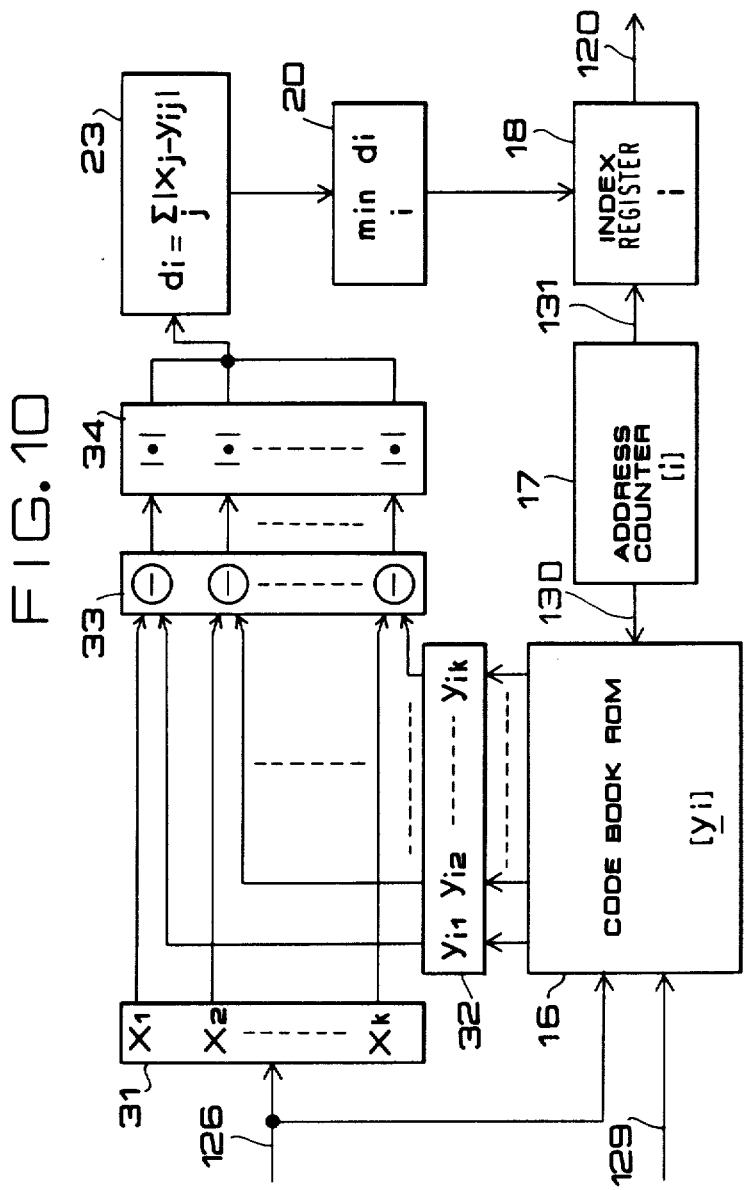

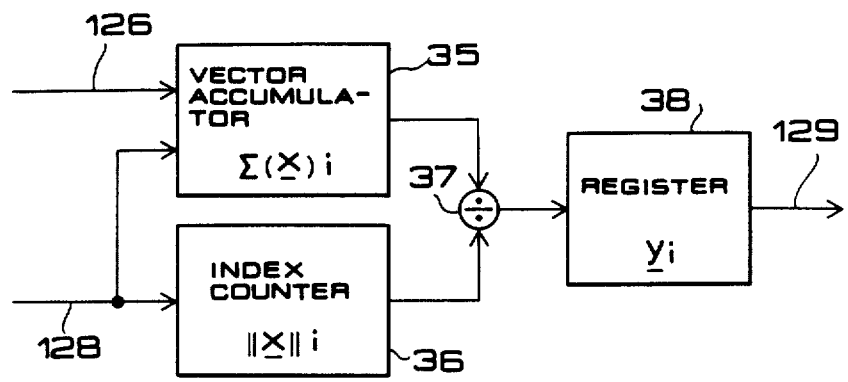
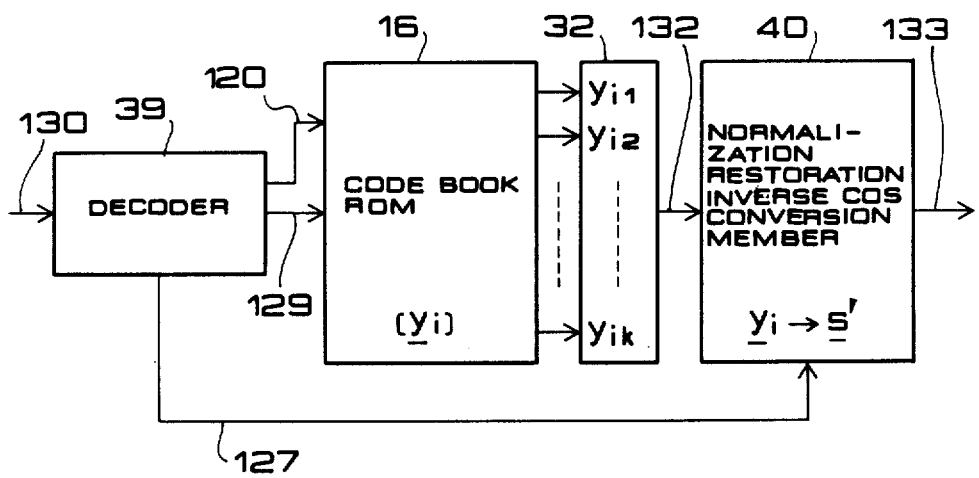

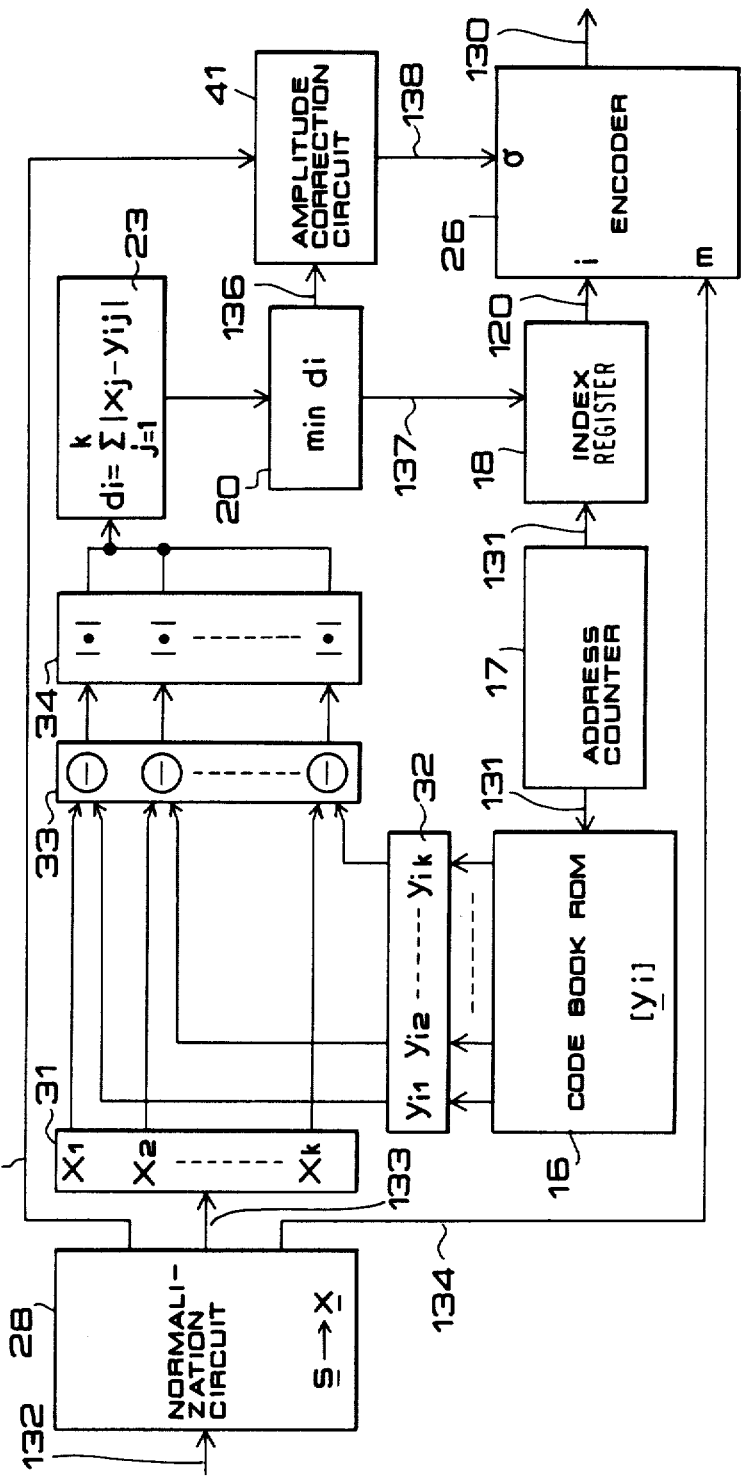

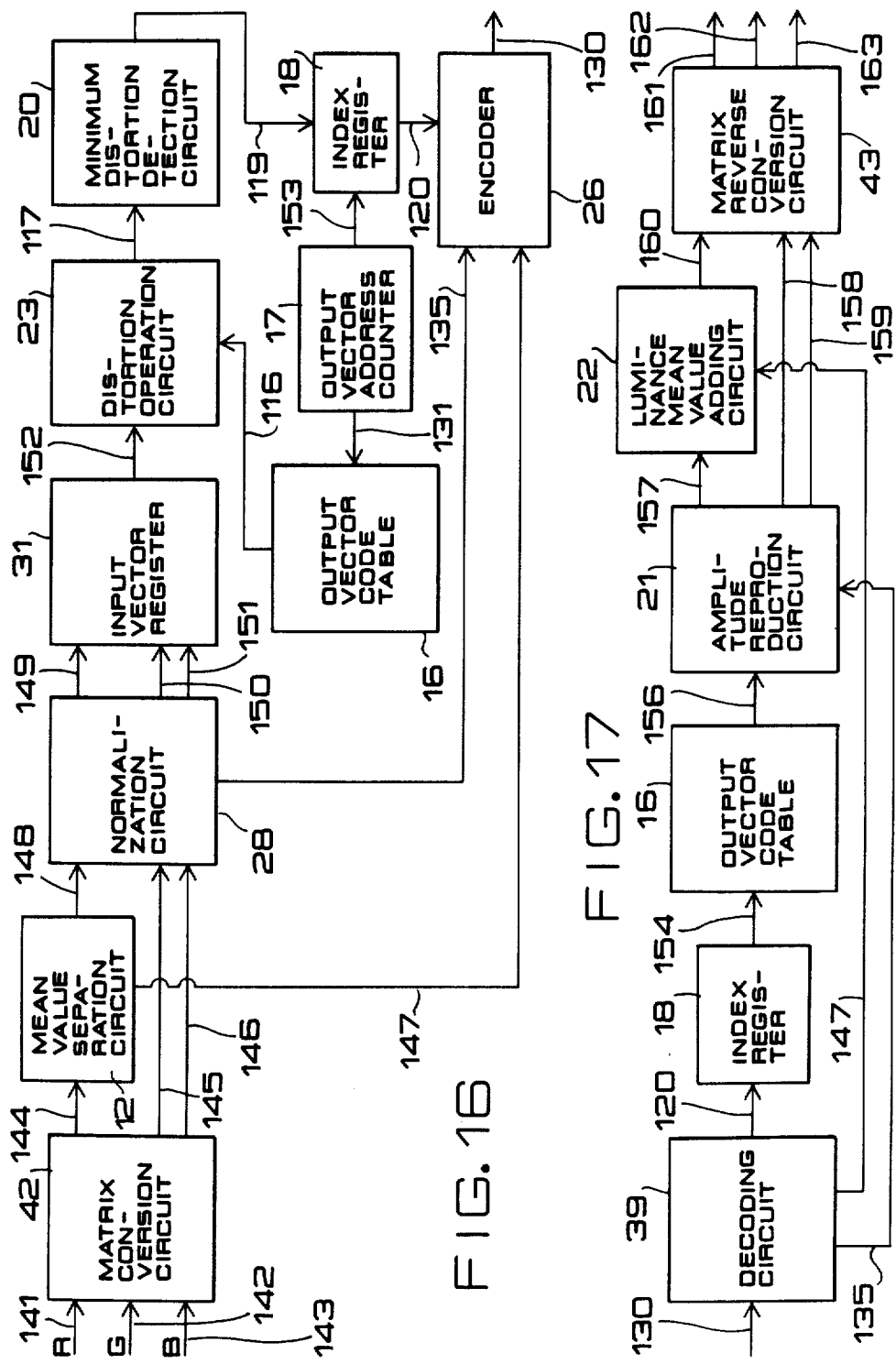

INTERFRAME ADAPTIVE VECTOR QUANTIZATION ENCODING APPARATUS AND VIDEO ENCODING TRANSMISSION APPARATUS

BACKGROUND OF THE INVENTION

1. Field of the Invention

The present invention relates to an interframe adaptive vector quantization encoding apparatus which performs encoding of video signals at high efficiency using vector quantization, and also to a video encoding transmission apparatus which transmits the encoding signals.

2. Description of the Prior Art

First, principle of the vector quantization will be described briefly. The input signal series of K in number are brought together into input vector $\underline{X} = \{x_1, x_2, \ldots x_K\}$. Then, the K-dimensional Euclidean signal space $R^k (\underline{X} \in R^k)$ has the representative points of N in number (i.e., output vector) $\underline{y}_i = \{y_{i1}, y_{i2}, \ldots y_{ik}\}$, and set of the representative points is made $Y = [\underline{y}_1, \underline{y}_2, \ldots \underline{y}$HD $n$]. The vector quantizer determines output vector $\underline{y}_i$ as hereinafter described from the set of output vectors, and retrieves it. The output vector $\underline{y}_i$ is in the minimum distance (minimum distortion) to the input vector, and it follows that:

if, $d(\underline{X}, \underline{y}_i) < d(\underline{X}, \underline{y}_j)$ for all $j \underline{X} \rightarrow \underline{y}_i$ wherein, $d(\underline{X}, \underline{y}_i)$ represents distance (distortion) between input/output vectors. Then, the input vector $\underline{X}$ is transmitted or recorded in index i of the output vector. At reproduction, set Y of the output vector $\underline{y}_i$ can be determined by clustering using the video signal series being the training model (repetition of the selection of the representative points and the quantization of the training model into each representative point until the total distortion becoming minimum). Furthermore, in order to improve efficiency of the vector quantization and versatility of the output vector set, the vector quantization may be performed at separation of the mean value of vectors and the normalization in amplitude.

An interframe adaptive vector quantization apparatus in the prior art will be described.

FIG. 2 is a block diagram of an interframe adaptive vector quantization apparatus in the prior art illustrating a constitution example of an encoding member thereof. In FIG. 2, numeral 1 designates an A/D converter, numeral 2 a raster/block scan conversion circuit where digital video signals in raster form by the A/D conversion are made a block per every m picture elements x n lines (m, n: integer), numeral 3 a vector quantization encoder which encodes the block data at high efficiency by means of vector quantization, numeral 4 a transmission data buffer where the encoded data at high efficiency is stored and transmitted to the transmission path at constant speed, numeral 5 a movement detection control circuit which controls threshold value of movement detection in the vector quantization encoder corresponding to the data amount stored in the transmission data buffer, numeral 6 a vector quantization decoder which decodes the encoded data supplied from the vector quantization encoder and reproduces the block data, numeral 7 a variable delay circuit, and numeral 8 a frame memory.

FIG. 3 is a block diagram of the interframe adaptive vector quantization encoding apparatus in the prior art illustrating a constitution example of a decoding member. In FIG. 3, numeral 9 designates a receiving data buffer where the encoding data supplied from the transmission path is received and stored and then outputted at speed corresponding to the decoding action, numeral 10 a block/raster scan conversion circuit where the block data decoded and reproduced is converted into data in raster form, and numeral 11 a D/A converter.

Encoding and decoding operation of the apparatus will now be described referring to FIG. 2 and FIG. 3.

Input video signals (101) are analog signals which are raster-scanned from the left to the right on the screen and from the upper side to the lower side. The analog signals in raster form are converted into digital signals (102) by the A/D converter 1, and then the digital signals in raster form are made a block per every m picture elements x n lines (m, n: integer) by the raster/block conversion circuit 2, and further vector data $\underline{S}$ (103) is obtained from the picture element sample within the block.

Difference signal between the vector data $\underline{S}$ (103) and frame vector data $\underline{P}$ (104) based on the same position block within the frame memory 8 becomes interframe difference vector $\underline{\epsilon}$ (105), which is inputted to the vector quantization encoder 3. The vector quantization encoder 3 applies processing of mean value separation and normalization to the interframe difference vector $\underline{\epsilon}$ (105), and performs movement detection using mean value and amplitude coefficient obtained by the processing and using threshold value (106), and performs vector quantization of only vector of significant block based on the movement. And then the vector quantization encoder 3 encodes the significance/insignificance information, the mean value, the amplitude coefficient and the vector quantization index information each using variable length encoding or the like, and outputs the encoding data (107). The transmission data buffer 4 stores the encoding data (107) and transmits it to the transmission path at constant speed according to prescribed transmission speed, and estimates data storage amount (108) and supplies it to the movement detection control circuit 5. The movement detection control circuit 5 controls the threshold value (106) for the movement detection depending on variation of the data storage amount (108).

The encoding data outputted from the vector quantization encoder 3 is encoded according to reverse processing of the encoding in the vector quantization decoder 6, thereby interframe difference reproduction vector $\underline{\hat{\epsilon}}$ (109) is reproduced. The interframe difference reproduction vector $\underline{\hat{\epsilon}}$ (109) obtained in the processing and the frame vector data $\underline{P}$ (104) delayed by prescribed time by means of the variable delay circuit 7 are added, thereby reproduction vector data $\underline{\hat{S}}$ (110) is restored and the block data at corresponding position of the frame memory is updated.

On the other hand, the encoding data (107) after being received and speed-changed in the receiving data buffer 9 is decoded by the vector quantization decoder 6, thereby interframe difference reproduction vector $\underline{\hat{\epsilon}}$ (109) is reproduced. The interframe difference reproduction vector $\underline{\hat{\epsilon}}$ (109) and the frame vector data $\underline{P}$ (104) passing through the variable delay circuit 7 are added, and reproduction vector data $\underline{\hat{S}}$ (110) is restored in similar manner to the processing in the encoding member. The reproduction vector data $\underline{\hat{S}}$ (110) is converted into data (111) of raster form by the block/raster scan conversion circuit 10, and the data (111) is converted in D/A conversion by the D/A converter 11 so as to obtain analog reproduction video signal (112).

Next, constitution and operation of the vector quantization encoder and the vector quantization decoder will be described in detail. FIG. 5 shows a constitution example of a vector quantization encoder in the prior art. In FIG. 5, numeral 19 designates a mean value separation and normalization circuit, numeral 13 a movement detection circuit, numeral 23 a distortion operation circuit, numeral 20 a minimum distortion detection circuit, numeral 16 a code book ROM, numeral 17 an address counter, and numeral 18 an index register.

Operation of the vector quantization encoder will be described.

The mean value separation and normalization circuit performs operation as hereinafter described to interframe difference vector $\underline{\epsilon}$ (113) being input signal thereof, and converts it into normalization vector $\underline{x}$.

Assuming that intrablock mean value of $\underline{\epsilon} = [\epsilon_1, \epsilon_2, \ldots, \epsilon_k]$ ($k = m \times n$) to be m and amplitude coefficient thereof be $\sigma$, it follows that:

$$m = \frac{1}{k} \sum_{j=1}^{k} \epsilon_j \ (j = 1, 2, \ldots, k)$$

$$\sigma = \left[ \frac{1}{k} \sum_{j=1}^{k} (\epsilon_j - m)^2 \right]^{\frac{1}{2}}$$

Approximate expression of $\sigma$ such that $$\sigma = \frac{1}{k} \sum_{j=1}^{k} |\epsilon_j - m|, \ \sigma = \max_j \epsilon_j - \min_j \epsilon_j$$

or the like may be used.

Assuming that $$x_j = (\epsilon_j - m)/\sigma$$

$$\underline{x} = [x_1, x_2, \ldots, x_k]$$

the mean value m, the amplitude coefficient $\sigma$, the normalization vector $\underline{x}$ can be obtained.

The mean value m (114) and the amplitude coefficient $\sigma$ (118) obtained are inputted to the movement detection circuit 13, and compared with the threshold values $T_0$, $T_1$, thereby the significance/insignificance block discrimination, i.e., the movement detection processing is performed according to following conditions and the block discrimination information $\nu$ (121) is outputted.

$$\begin{cases} \text{If } m < T_0 \text{ and } \sigma < T_1; \ \nu = 0 \text{ (insignificant block)} \\ \text{If } m > T_0 \text{ or } \sigma > T_1; \ \nu = 1 \text{ (significant block)} \end{cases}$$

The block discrimination information $\nu$ is transmitted per each block. Only in the case that $\nu$ is 1, following processing is performed.

The normalization vector $\underline{x}$ (122) is transmitted to the distortion operation circuit $\overline{23}$ and subjected to following vector quantization processing.

Set of a plurality of output vectors $\underline{y}_i$ (116) ($i = 1, 2, \ldots, N$) is produced using clustering method based on statistical property of the normalization vector $\underline{x}$, and written in the code book ROM 16. When the normalization vector $\underline{x}$ (122) is inputted to the distortion operation circuit 23, the address counter 17 performs count-up in sequence of $i = 1, 2, \ldots, N$, and reads the output vector $\underline{y}_i$ (116) corresponding to the address information i in sequence of $\underline{y}_1, \underline{y}_2, \ldots, \underline{y}_N$ from the code book ROM 16 of the output vector. Distortions d ($\underline{x}, \underline{y}_i$) (117) between the normalization vector $\underline{x}$ and N output vectors $\underline{y}_i$ read in sequence are calculated sequentially in the distortion operation circuit 23. The distortion calculation is executed according to following formula.

$$d(\underline{x}, \underline{y}_i) = \left[ \sum_{j=1}^{k} (x_j - y_{ij})^2 \right]^{\frac{1}{2}} \ (j = 1, 2, \ldots k)$$

Otherwise, approximate expression such that $$d(\underline{x}, \underline{y}_i) = \sum_{j=1}^{k} |x_j - y_{ij}|$$

$$d(\underline{x}, \underline{y}_i) = \max_j |x_j - y_{ij}|$$

may be used.

In the minimum distortion detection circuit 20, the minimum distortion among the N distortions estimated by the above calculation is detected, and the output vector address information i in the code book ROM indicated by the address counter is taken in the index latch 18 and outputted as the output vector index i (120).

The intrablock mean value m (114), the amplitude coefficient (118), the block discrimination information $\nu$ (121) and the output vector index i (120), all obtained in the above process, are converted into codes being suitable as the vector quantization encoding information (107) and then outputted. In this case, if $\nu$ is 0, codes in other information are not outputted.

A vector quantization decoder shown in FIG. 4 will now be described.

In FIG. 4, numeral 21 designates an amplitude coefficient multiplier, and numeral 22 a mean value adder.

Among the vector quantization encoding information (107) transmitted from the receiving data buffer 9, the block discrimination information $\nu$ (121) is first decoded. If $\nu = 1$, i.e., if the block is significant, the decoded output vector index i (120) is taken in the index register 18. In the code book ROM 16 where the same content as that of the code book ROM of the vector quantization encoder is written, the output vector $\underline{y}_i$ (119) indicated by the index i (120) is read. The amplitude coefficient $\sigma$ (118) is multiplied to the output vector $\underline{y}_i$ in the amplitude coefficient multiplier 21 and the mean value m (114) is added to the product in the mean value adder 22, thereby the interframe difference reproduction vector $\underline{\hat{\epsilon}}$ (109) is decoded. That is, following processing is executed.

$$\underline{\hat{\epsilon}} = [\hat{\epsilon}_1, \hat{\epsilon}_2, \ldots, \hat{\epsilon}_k]$$

$$\hat{\epsilon}_j = \sigma \cdot y_{ij} + m \ (j = 1, 2, \ldots, k)$$

If $\nu = 0$, i.e., if the block is insignificant, $\epsilon$ is decoded and reproduced assuming that $m = 0$, $\sigma = 0$.

$$\underline{\hat{\epsilon}} = [0, 0, \ldots, 0]$$

Since the interframe adaptive vector quantization encoding apparatus in the prior art is constituted as above described, calculation of $\sigma$ for normalization and calculation of the square sum ($\Sigma (a-b)^2$) in the vector quantization distortion operation must be performed at many times, thereby the circuit scale of the apparatus increases. When these calculations are executed using the approximate expressions, the picture quality may be deteriorated due to the calculation error.

Also in the prior art, it is difficult to obtain a universal output vector set which can cope with the picture image having significantly different statistical properties, such as picture image including a document and drawings as main components, picture image requiring the delicate gradation expression or picture image using different sensor system, thereby content of the code book ROM increases.

Further, there exists the problem of mismatching in the quantization apparatus.

Moreover, in order to establish the synchronization of the video frame between receiving and transmission, time deviation of the top end position between the transmission frame synchronous pattern and the video frame (the number of time slots) must be counted at the transmission side and transmitted to the receiving side, and the top end position of the video frame must be detected from such information at the receiving side and clocks necessary for the decoding processing must be reproduced, thereby the apparatus constitution and the transmission control system become complicated. When the transmission speed is slow, the information amount which can be transmitted in one video frame time becomes small. Even if the speed is smoothed at the buffer memory of the transmission side, the transmission efficiency of the encoding data becomes bad and the synchronization of the video frame between transmission and receiving cannot be established.

SUMMARY OF THE INVENTION

The invention relates to an interframe adaptive vector quantization encoding apparatus, wherein analog signals raster-scanned from the left to the right on the screen and from the upper side to the lower side are converted into digital signals by an A/D converter, the digital video signals in raster form are made a block per every m picture elements ×n lines (m, n: integer) by a raster/block scan conversion circuit, the block data is encoded at high efficiency by means of vector quantization in a vector quantization encoder, the encoded data at high efficiency is transmitted to the transmission path at constant speed by a transmission data buffer, threshold value of movement detection in the vector quantization encoder is controlled by a movement detection control circuit, and the encoding data supplied from the vector quantization encoder is decoded and the block data is reproduced by a vector quantization decoder. The vector quantization encoder estimates inner product between input vector subjected to mean value separation and output vector read from a code book ROM by an inner product operation circuit, and estimates the maximum value of the inner product by a maximum inner product detection circuit and makes it amplitude coefficient.

According to the invention, since intrablock mean value is separated in a mean value separation circuit and then inner product operation is performed in product sum form and the maximum value is detected so as to estimate the optimum output vector and the amplitude coefficient simultaneously, the operation is simplified and the circuit scale in the apparatus decreases. Since the approximate expression need not be used in the inner product operation, the movement detection and the detection of optimum output vector can be performed at higher accuracy and the reproduction picture quality is improved.

In an encoding member of a vector quantizer as another embodiment of the invention, mean value separated by a mean value separation circuit is subjected to differential PCM encoding (hereinafter referred to as "DPCM encoding") thereby redundancy is removed. The input vector after the mean value separation is not subjected to amplitude normalization but the inner product operation is performed in product sum form, and the maximum value is detected and subjected to the DPCM encoding thereby the redundancy is removed, and then the encoding is performed.

According to this embodiment, the amplitude normalization circuit is removed in the vector quantization encoding member, and the scalar quantization encoding processing of the amplitude coefficient can be simplified and the circuit scale be reduced. Further, the vector quantizer to enable the redundancy removing using the DPCM encoding to the mean value component and the amplitude coefficient can be provided.

A vector quantizer as another embodiment of the invention comprises a code table memory which can rewrite the contact dynamically, cos conversion normalization member for converting the input vector in cos conversion and then performing the normalization processing, a vector quantization member including the code table memory for performing vector quantization of the input vector subjected to the cos conversion normalization, a code table updating member where group of the input vectors of cos conversion normalization quantized into the same index in the vector quantization member are added and averaged and written as new set of output vectors of cos conversion normalization in the code table memory, and a normalization restoration inverse cos conversion member for performing reverse processing to the cos conversion normalization member.

According to this embodiment, even if images significantly different in statistical property are inputted, since the circuit is constituted so that a new set of output vectors by the cos conversion normalization are extracted in clustering and the code table in the encoding member and the decoding member is updated and vector quantization is performed in the cos conversion normalization state, clustering of high speed using a relatively small clustering model without increasing the capacity of the code table enables a set of output vectors with little noise in the vector quantization, and the vector quantization of high quality can be effected to various images.

In a further embodiment of the invention, an amplitude correction circuit is provided to correct amplitude component in the minimum distortion, and the corrected amplitude component is encoded.

According to this embodiment, correction is applied to amplitude while the normalization output vector is reproduced using the quantization distortion, thereby the adaptive vector quantizer is obtained without mismatching of the quantizer.

In still another embodiment of the invention, when color video input signals are composed of three components, red, green and blue, matrix conversion of the three components is performed into luminance component and color difference component, and then the color difference component is sampled and at the same time the mean value of the luminance component is separated or the mean value of the luminance component and the mean value of the color difference component are separated, thereby the vector of normalization is subjected to vector quantization.

According to this embodiment, a color video vector quantizer to reduce redundancy of any color video signal is obtained using set of a small number of output vectors and increasing the hardware to the least degree.

In another embodiment of the invention, when color video input signals are composed of three components, red, green and blue, each reproduction color video signal after encoding is multiplied by a prediction coefficient utilizing correlation between channels so as to form a color video prediction signal of each channel, thereby the vector quantization noise is smoothed throughout each channel and accumulation of noise in the encoding loop is prevented.

According to this embodiment, a color image efficient encoding apparatus to improve the color reproducibility in region of significant color variation can be obtained without deteriorating the encoding efficiency.

In another embodiment of the invention, a controller is installed to perform matching in the timing of the video frame between the buffer at transmission side and the buffer at receiving side.

According to this embodiment, matching of the timing of the video frame is performed between the transmission and receiving sides without transmitting the top end position information of the video frame and the clock information of decoding to the receiving side, thereby the transmission control system and the control of the transmission and receiving buffers for the speed smoothing can be made easy.

BRIEF DESCRIPTION OF THE DRAWINGS

FIG. 8 is a block diagram illustrating constitution of a vector quantization decoder as another embodiment of the invention;

FIG. 9 is a block diagram illustrating constitution of an encoding member of a vector quantizer as another embodiment of the invention;

FIG. 10 is a block diagram illustrating constitution of a vector quantization member in FIG. 9;

FIG. 11 is a block diagram illustrating constitution of a code table updating member in FIG. 9;

FIG. 12 is a block diagram illustrating constitution of a decoding member of a vector quantizer as another embodiment of the invention;

FIG. 13 is a block diagram illustrating constitution of an encoding member of an adaptive vector quantizer as still another embodiment of the invention;

FIG. 16 is a block diagram illustrating constitution of an encoding member of a color video signal adaptive vector quantizer as another embodiment of the invention;

FIG. 17 is a block diagram illustrating constitution of a decoding member of a color video signal adaptive vector quantizer as another embodiment of the invention;

PREFERRED EMBODIMENTS OF THE INVENTION

The invention will now be described in detail.

Figure 2:
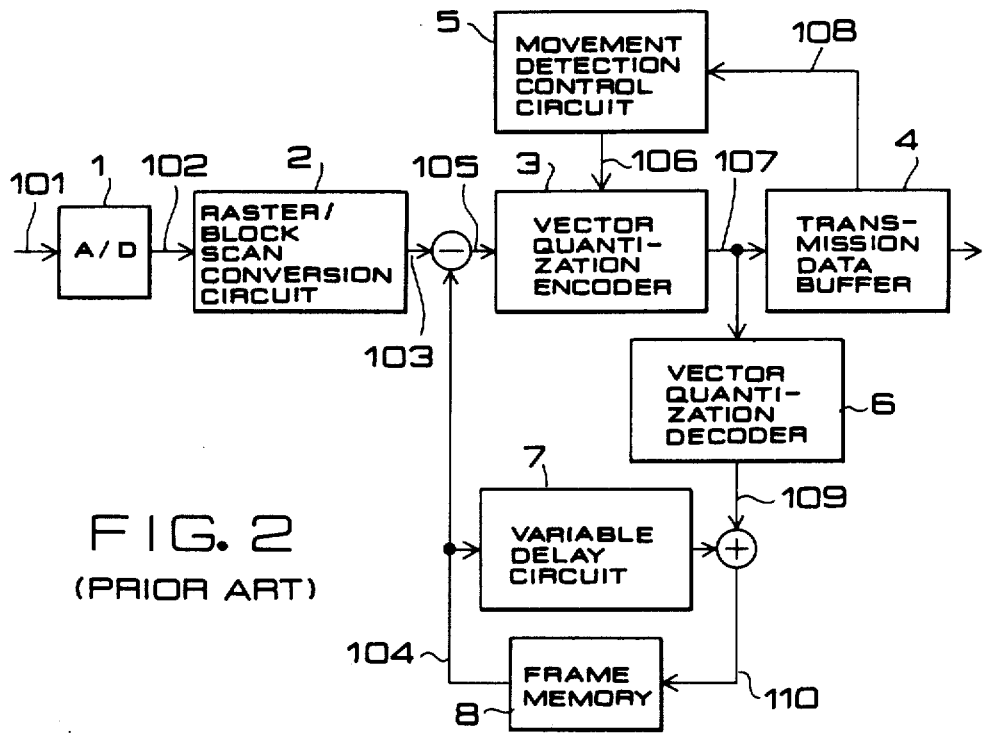
FIG. 2 is a block diagram illustrating constitution of an encoding member of an interframe adaptive vector quantization encoding apparatus in the prior art.

FIG. 2 is a block diagram illustrating a constitution example of an encoding member of an interframe adaptive vector quantization apparatus of the invention. In FIG. 2, numeral 1 designates an A/D converter, numeral 2 a raster/block scan conversion circuit where digital video signals in raster form by the A/D conversion are made a block per every m picture elements×n lines (m, n: integer), numeral 3 a vector quantization encoder which encodes the block data at high efficiency by means of vector quantization, numeral 4 a transmission data buffer where the encoded data at high efficiency is stored and transmitted to the transmission path at constant speed, numeral 5 a movement detection control circuit which controls threshold value of movement detection in the vector quantization encoder corresponding to the data amount stored in the transmission data buffer, numeral 6 a vector quantization decoder which decodes the encoding data supplied from the vector quantization encoder and reproduces the block data, numeral 7 a variable delay circuit, and numeral 8 a frame memory.

Figure 3:
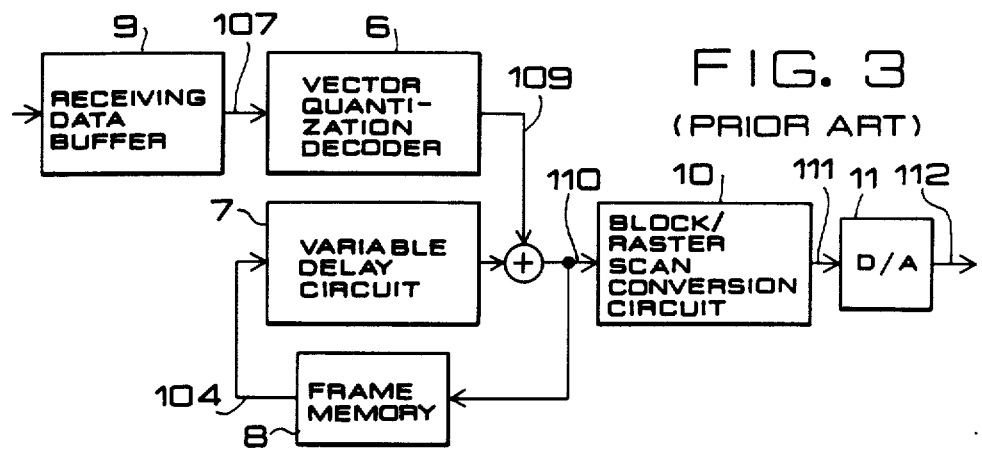
FIG. 3 is a block diagram illustrating constitution of a decoding member of an interframe adaptive vector quantization encoding apparatus in the prior art.

FIG. 3 is a block diagram illustrating a constitution example of a decoding member of the interframe adaptive quantization encoding apparatus. In FIG. 3, numeral 9 designates a receiving data buffer where the encoding data supplied from the transmission path is received and stored and then outputted at speed corresponding to the decoding action, numeral 10 a block/raster scan conversion circuit where the block data decoded and reproduced is converted into data in raster form, and numeral 11 a D/A converter.

Encoding and decoding operation of the apparatus will now be described referring to FIG. 2 and FIG. 3.

Input video signals (101) are analog signals which are raster-scanned from the left to the right on the screen and from the upper side to the lower side. The analog signals in raster form are converted into digital signals (102) by the A/D converter 1, and then the digital signals in raster form are made a block per every m picture elements×n lines (m, n: integer) by the raster-/block conversion circuit 2, and further the picture element sample within the block is arranged in one-dimensional arrangement so as to obtain vector data S (103). Difference signal between the vector data $\underline{S}$ (103) and frame vector data $\underline{P}$ (104) based on the same position block within the frame memory 8 becomes interframe difference vector $\underline{\epsilon}$ (105), which is inputted to the vector quantization encoder 3. The vector quantization encoder 3 applies processing of mean value separation and normalization to the interframe difference vector $\underline{\epsilon}$ (105), and performs movement detecting using mean value and amplitude coefficient obtained by the processing and using threshold value (106), and performs vector quantization of only vector of significant block based on the movement. And then the vector quantization encoder 3 encodes the significance/insignificance block information, the mean value, the amplitude coefficient and the vector quantization index information each using variable length encoding or the like, and outputs the encoding data (107). The transmission data buffer 4 stores the encoding data (107) and transmits it to the transmission path at constant speed according to prescribed transmission speed, and estimates data storage amount (108) and supplies it to the movement detection control circuit 5. The movement detection circuit 5 controls the threshold value (106) for the movement detection depending on variation of the data storage amount (108).

The encoding data outputted from the vector quantization encoder 3 is decoded according to reverse processing of the encoding in the vector quantization decoder 6, thereby interframe difference reproduction vector $\underline{\hat{\epsilon}}$ (109) is reproduced. The interframe difference reproduction vector $\underline{\hat{\epsilon}}$ (109) obtained in the processing and the frame vector data $\underline{P}$ (104) delayed by prescribed time by means of the variable delay circuit 7 are added, thereby reproduction vector data $\underline{S}$ (110) is restored and the block data at corresponding position of the frame memory is updated. Above process is shown in following expressions.

$$\underline{\epsilon} = \underline{S} - \underline{P}$$

$\underline{\hat{\epsilon}} = \underline{\epsilon} + \underline{\theta}$ ($\underline{\theta}$ represents operation error in vector quantization encoding.)

$$\underline{\hat{S}} = \underline{P} + \underline{\hat{\epsilon}}$$

$\underline{P} = \underline{\hat{S}} \cdot Z^{-f}$ ($Z^{-f}$ representing one frame delay.)

On the other hand, the encoding data (107) after received and speed-changed in the receiving data buffer 9 is decoded by the vector quantization decoder 6, thereby interframe difference reproduction vector $\underline{\hat{\epsilon}}$ (109) is reproduced. The interframe difference reproduction vector $\underline{\hat{\epsilon}}$ and the frame vector data $\underline{P}$ (104) passing through the variable delay circuit 7 are added, and reproduction vector data $\underline{\hat{S}}$ (110) is restored in similar manner to the processing in the encoding member.

That is, vector operation $$\underline{\hat{S}} = \underline{P} + \underline{\hat{\epsilon}} = \underline{S} + \underline{\theta}$$

is executed. The reproduction vector data $\underline{\hat{S}}$ (110) is converted into data (111) of raster form by the block-/raster scan conversion circuit 10, and the data (111) is converted in D/A conversion by the D/A converter 11 so as to obtain analog reproduction video signal (112).

Next, constitution and operation of the vector quantization encoder and the vector quantization decoder will be described in detail.

Figure 1:
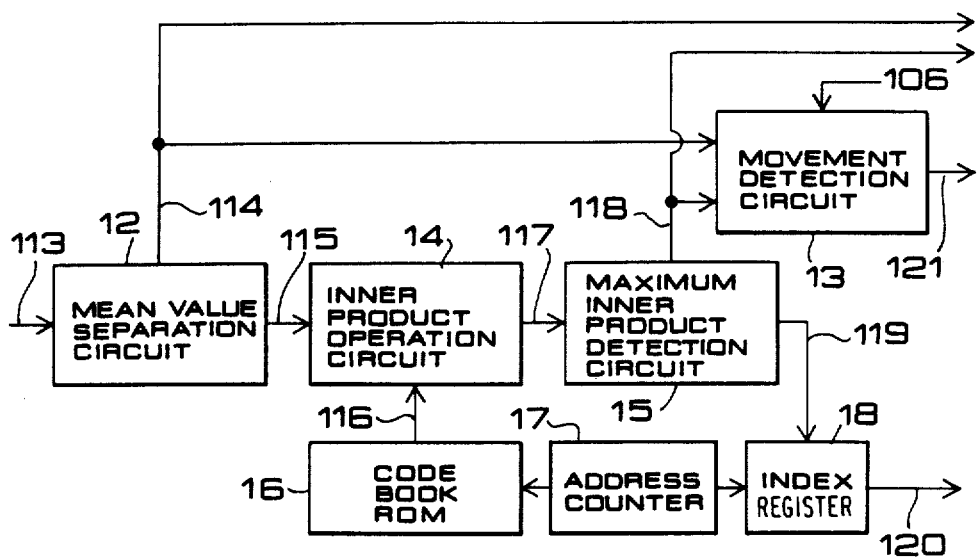
FIG. 1 is a block diagram illustrating constitution of a vector quantization encoder as an embodiment of the invention.

In FIG. 1, numeral 12 designates a mean value separation circuit which estimates intrablock mean value of interframe difference vector and separates the mean value, numeral 14 an inner product operation circuit which estimates inner product between input vector by the mean value separation and output vector read from a code book ROM, numeral 15 a maximum inner product detection circuit which detects the optimum output vector by estimating maximum value of inner products between input and output vectors obtained with respect to a plurality of output vectors and determines amplitude coefficient at the vector quantization decoding, numeral 13 a movement detection circuit which performs movement detection using obtained mean value, amplitude coefficient and threshold value and outputs significance/insignificance block discrimination information, numeral 16 a code book ROM, numeral 17 an address counter, and numeral 18 an index register.

The operation will be described. The mean value separation circuit 12 performs operation as hereinafter described to interframe difference vector $\underline{\epsilon}$ (113) being input vector, and converts it into input vector $\underline{x}^*$. Assuming that intrablock mean value of $\underline{\epsilon} = [\epsilon_1, \epsilon_2, \ldots, \epsilon_k]$ be m, execution of $$m = \frac{1}{k} \sum_{j=1}^{k} \epsilon_j \, (j = 1, 2, \ldots, k)$$

$$x^*_j = \epsilon_j - m$$

$$\underline{x}^* = [x^*_1, x^*_2, \ldots, x^*_k]$$

produces the mean value m and the input vector $\underline{x}^*$.

The inner product operation circuit 14 estimates the inner product between the obtained input vector $\underline{x}^*$ and output vector in the code book ROM 16 where a set of output vectors $\underline{y}_i$ (116)(i=1, 2, ..., N) optimized by clustering or the like are written using normalization vector subjected to mean value separation and normalization by $\underline{x} = [x_1, x_2, \ldots, x_k]$. The inner product F ($\underline{x}$, $\underline{y}_i$) is estimated according to following formula.

$$F(\underline{x}, \underline{y}_i) = \sum_{j=1}^{k} (x_j \cdot y_{ij}) \, (j = 1, 2, \ldots, k)$$

Among the obtained inner products of N in number, the maximum value is detected by the maximum inner product detection circuit 15 and at the same time the maximum inner product is outputted as amplitude coefficient $\sigma^*$ to the movement detecting circuit 13.

Figure 6:
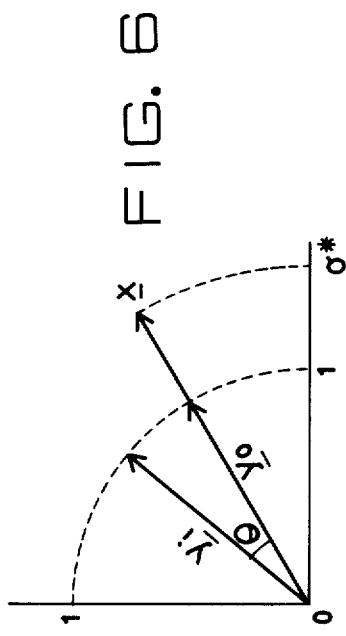
FIG. 6 is a diagram illustrating operation of a vector quantization encoder as an embodiment of the invention.

Assuming that the output vector index to provide the maximum inner product be 0 and the input/output vector be two-dimensional vector (k=2), $\underline{y}_0$ becomes the optimum output vector and the maximum inner product is obtained as amplitude coefficient. This will be explained referring to FIG. 6.

Since $y_i$ is subject to mean value separation and normalization, it follows that $$|\underline{y_i}| = 1$$

Assuming that angle between $\underline{x}$ and $\underline{y_i}$ be $\theta$, it follows that $$F(\underline{x}, \underline{y_i}) = \sum_{j=1}^{2} x_j \cdot y_{ij}$$
$$= |\underline{x}| \ |\underline{y_i}| \cos\theta = |\underline{x}| \cdot \cos\theta$$

Consequently, when $\theta = 0$, $\underline{x}$ and $\underline{y_i}$ become vectors in the same direction, the distance within two-dimensional plane becomes minimum. Since condition of $\cos\theta$ is that $-1 \leq \cos\theta \leq 1$, when $\theta = 0$, $\cos\theta = 1$ and $F(\underline{x}, \underline{y_i})$ becomes maximum. Hence, $y_0$ to maximize the $F(\underline{x}, \underline{y_i})$ is obtained as the optimum output vector. Since $$F(\underline{x}, \underline{y_0}) = |\underline{x}| \ |\underline{y_0}| \cos\theta$$
$$= \sigma^* |\underline{y_0}|$$
$$= \sigma^*$$

max $F(\underline{x}, \underline{y_i})$ may be used as the amplitude coefficient $\sigma^*$.

The obtained amplitude coefficient $\sigma^*$ and the mean value m are inputted together to the movement detection circuit 13, and compared with the threshold values $T_0$, $T_1$ (106), thereby the significance/insignificance block discrimination, i.e., the movement detection processing is performed according to following conditions and the block discrimination information $\nu$(121) is outputted.

$$\begin{cases} \text{If } m < T_0 \text{ and } \sigma < T_1; \nu = 0 \text{ (insignificant block)} \\ \text{If } m > T_0 \text{ or } \sigma > T_1; \nu = 1 \text{ (significant block)} \end{cases}$$

The block discrimination information $\nu$ is transmitted per each block.

The intrablock mean value m (114), the amplitude coefficient (118), the block discrimination information $\nu$ (121) and the output vector index i (120), all obtained in the above process, are converted into codes being suitable as the vector quantization encoding information (107) and then outputted. In this case, if $\nu=0$, codes in other information are not outputted.

A vector quantization decoder shown in FIG. 4 will now be described.

Figure 4:
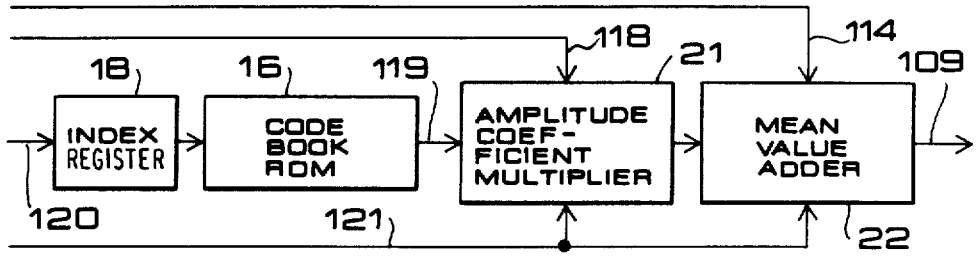
FIG. 4 is a block diagram illustrating constitution of a vector quantization decoder in the prior art.
Figure 5:
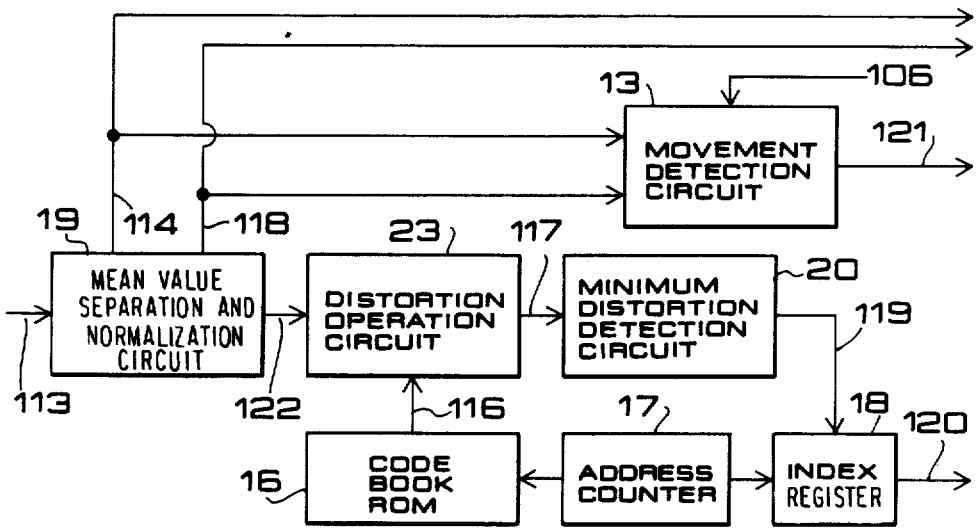
FIG. 5 is a block diagram illustrating constitution of a vector quantization encoder in the prior art.

In FIG. 4, numeral 21 designates an amplitude coefficient multiplier, and numeral 22 a mean value adder.

Among the vector quantization encoding information (107) transmitted from the receiving data buffer 9, the block discrimination information $\nu$ is first decoded. If $\nu=1$, i.e., the block is significant, the decoded output vector index i (120) is taken in the index latch 19. In the code book ROM 20 where the same content as that of the code book ROM of the vector quantization encoder is written, the output vector $\underline{y_i}$ (119) indicated by the index i (120) is read. The amplitude coefficient $\sigma^*$ (118) is multiplied to the output vector $\underline{y_i}$ in the amplitude coefficient multiplier 21 and the mean value m (114) is added to the product in the mean value adder 22, thereby the interframe difference reproduction vector $\underline{\hat{\epsilon}}$ (109) is decoded. That is, following processing is executed.

$$\underline{\hat{\epsilon}} = [\epsilon_1, \epsilon_2, \ldots, \epsilon_k]$$

$$\epsilon_j = \sigma \cdot y_{ij} + m \ (j = 1, 2, \ldots, k)$$

If $\nu = 0$, i.e., if the block is insignificant, $\epsilon$ is decoded and reproduced assuming that $m = 0$, $\sigma = 0$.

$$\underline{\hat{\epsilon}} = [0, 0, \ldots, 0]$$

Figure 7:
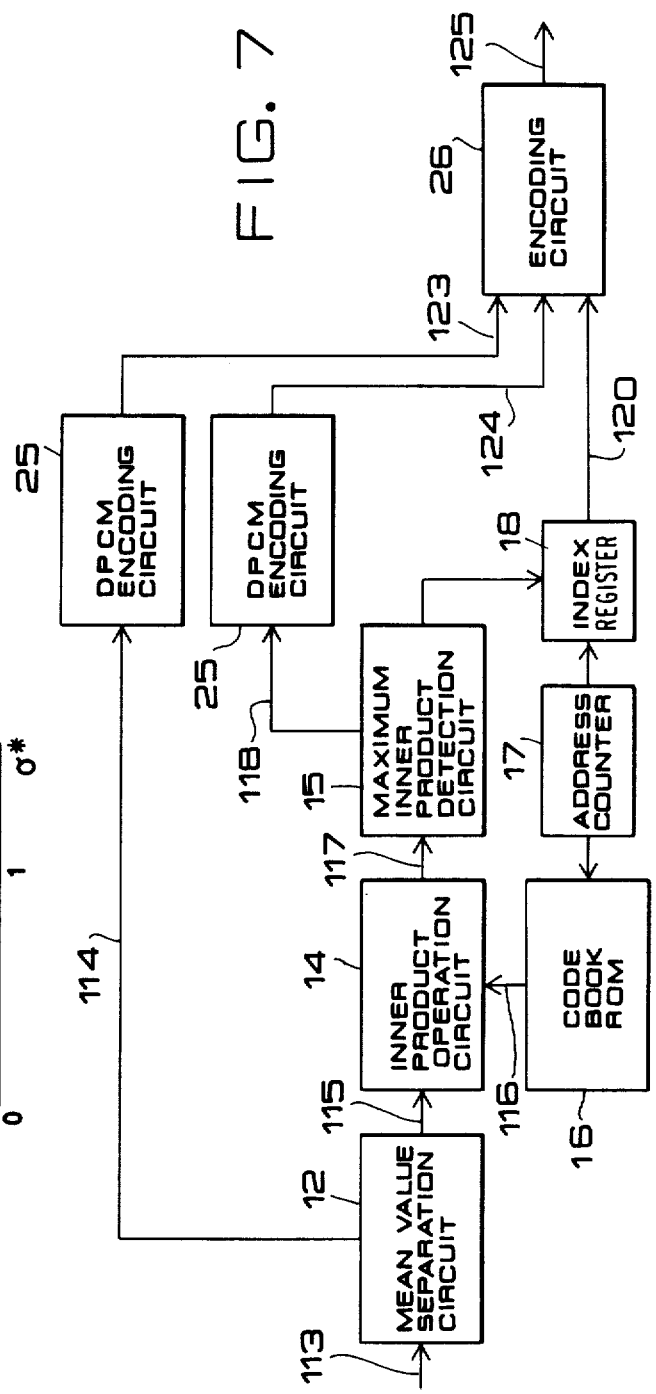
FIG. 7 is a block diagram illustrating constitution of a vector quantization encoder as another embodiment of the invention.

FIG. 7 and FIG. 8 show another embodiment of the invention. In this embodiment, an amplitude normalization circuit is removed, and a DPCM encoding circuit and a DPCM decoding circuit are inserted in vector quantization encoding member and decoding member respectively for mean value component and amplitude coefficient, so that introduction of the DPCM encoding removes redundancy for the mean value component and the amplitude coefficient.

Description of this embodiment is performed regarding the case that threshold control is not performed.

FIG. 7 shows a constitution example of the vector quantization encoding member. In FIG. 7, numeral 12 designates a mean value separation circuit, numeral 14 an inner product operation circuit, numeral 15 a maximum inner product detection circuit, numeral 16 a waveform code book ROM, numeral 17 an address counter, numeral 18 an index register, numeral 25 a DPCM encoding circuit, and numeral 26 an encoding circuit. Also, FIG. 8 shows a constitution example of the vector quantization decoding member. In FIG. 8, numeral 27 designates a DPCM decoding circuit, numeral 21 an amplitude coefficient multiplier, numeral 22 a mean value adder, and numeral 39 a decoding circuit.

In the vector quantization encoding member constituted as above described, the mean value component m (114) is processed in similar manner to the preceding embodiment, and its redundant component is deleted by the DPCM encoding circuit 25 and the difference signal $d\mu$ (123) is outputted.

On the other hand, the mean value separation vector $\underline{x}^*$ (115) is processed in similar manner to the preceding embodiment, and the maximum inner product Pmax (118) is detected by the maximum inner product operation circuit 15, and normalization address information i is taken in the index register 18 and outputted as the normalization output vector index i (120). The detected maximum inner product Pmax (118) is inputted as the amplitude coefficient g directly to the DPCM encoding circuit 25, and its redundant component is deleted and then the difference signal dg (124) is outputted.

The DPCM encoding circuit output $d\mu$ (123) for the mean value component m (114), the DPCM encoding circuit dg (124) for the amplitude coefficient g (118), and the normalization output vector index i (120) are subjected to variable length encoding in the encoding circuit 26.

Next, the vector quantization decoding operation will be described. The difference signal $d\mu$ (123) of the mean value component m, the difference signal dg (124) of the amplitude coefficient g, and the normalization output vector index i (120) are decoded in sequence in the decoding circuit 39.

The mean value m (114) is decoded and reproduced in the DPCM decoding circuit 27, and the amplitude coefficient gi (118) is decoded and reproduced in the DPCM encoding circuit 27. The normalization output vector index i (120) is taken in the index latch 18, and the normalization output vector $y_i$ (116) with address indicated by the normalization output vector index i (120) is read and decoded within the waveform code book ROM 16 where the same content as that of the waveform code book ROM 16 in the vector quantization encoding member is written. The normalization output vector $y_i$ (116) is multiplied by the decoded amplitude coefficient $g_j$ (123) in the amplitude coefficient multiplier 21, and the decoded mean value component $\mu$ (114) is added to the product thereby the encoding reproduction vector $\hat{S}$ (109) is obtained.

Still another embodiment of a vector quantization encoding member will now be described.

FIG. 9 shows a constitution example of an encoding member in a video signal conversion vector quantizer. In FIG. 9, numeral 8 designates a video memory where the image to be quantized is stored, numeral 28 cos conversion normalization member, numeral 126 cos conversion normalization input vector, numeral 127 d.c. component and amplitude component of input vector 125, numeral 29 a vector quantization member, numeral 128 vector quantization index, numeral 30 a code table updating member, numeral 129 set of cos conversion normalization output vectors updated, numeral 26 an encoder, and numeral 130 encoding member output signal.

FIG. 10 shows a detailed constitution example of the vector quantization member 29. In FIG. 10, numeral 31 designates a normalization input vector register, numeral 17 a code table address counter, numeral 130 code table address, and numeral 16 a dynamic cos conversion normalization output vector code table (code book ROM) comprising first and second code table memories. Numeral 32 designates a normalization output vector register, numeral 33 a parallel subtractor for calculating difference between the input and output vectors subjected to cos conversion normalization, numeral 34 a parallel absolute value calculator for outputting absolute value of the difference calculated in the parallel subtractor 33, numeral 23 an absolute value distortion calculation circuit (accumulator), numeral 20 a minimum distortion detection circuit, and numeral 18 an index latch.

FIG. 11 shows a detailed constitution example of the code table updating member 30. In FIG. 11, numeral 35 designates a vector accumulator where the cos conversion normalization input vectors are accumulated per mapped index, numeral 36 an index counter for counting what number of the cos conversion normalization input vectors are mapped on each index, numeral 37 a division calculator where the sum calculated in the vector accumulator 35 is divided by the number counted in the index counter 36, and numeral 38 a register for holding the quotient obtained in the division calculator 37.

FIG. 12 shows a detailed constitution example of the decoding member in video signal conversion vector quantization according to the invention. In FIG. 12, numeral 39 designates a decoder, numeral 132 cos conversion normalization output vector, numeral 40 a normalization restoration inverse cos conversion member, and numeral 133 output vector.

Operation of this embodiment will be described. Basic principle is in that when images of different properties are inputted and a set of output vectors must be updated, clustering is performed using a group of input vectors as a model and a new set of output vectors are obtained, the input images are subjected to vector quantization using this set, and the vector quantization information and set of the updated output vectors are made the encoding output so as to cope with significant variation of the input images. In this case, vectors are processed in the cos conversion normalization state. In this constitution, clustering can be converged at high speed using a relatively small model, although it is usually converged in a long loop using a large model. This is because the signal series in the cos conversion is converted from vector in the space axis into vector in the time axis thereby the noise component superposed to high frequency component with small power is rapidly removed. Regarding the signal series $f(j)$ ($j=0, 1, \ldots, M-1$), one-dimensional cos conversion $F(u)$ of $f(j)$ becomes as follows:

$$F(u) = \frac{2C(u)}{M} \sum_{j=0}^{n-1} f(j)\cos\left[\frac{(2j+1)u}{2M}\pi\right]$$

$(u = 0, 1, \ldots, M-1)$ wherein, $$C(u) = \begin{cases} 1/\sqrt{2} & (u = 0) \\ 1 & (u = 1, 2, \ldots, M-1) \end{cases}$$

Also, inverse cos conversion $f(j)$ of $F(u)$ becomes as follows:

$$f(j) = \sum_{u=0}^{n-1} C(u)F(u)\cos\left[\frac{(2j+1)u}{2M}\pi\right]$$

$(j = 0, 1, \ldots, M-1)$

[Detailed description of the cos conversion is disclosed, for example, in PRATT "DIGITAL IMAGE PROCESSING" (WILEY INTERSCIENCE).]

The above-mentioned operation will be described referring to the accompanying drawings. In FIG. 9, video signals stored in the video memory 8 are read in form of K-dimensional input vectors (125), $\underline{S}=\{S_1, S_2, \ldots, S_k\}$. In the cos conversion normalization member 28, for example, as hereinafter described, the cos conversion normalization input vector 126, $\underline{X}=\{x_1, x_2, \ldots, x_k\}$, the d.c. component (m) and the amplitude component ($\sigma$) (127) are formed.

$$m = (\text{cos conversion first term}) = \frac{1}{K}\sum_{j=1}^{k} S_j$$

$$\sigma = \frac{1}{K}\sum_{j=2}^{k}\left|\frac{2}{K}\sum_{t=1}^{k} S_t\cos\left[\frac{(2t-1)(j-1)}{2K}\pi\right]\right|$$

$$x_j = \frac{2}{\sigma K}\sum_{t=1}^{k} S_t\cos\left[\frac{(2t-1)(j-1)}{2K}\pi\right]$$

$(j = 2, 3, \ldots, k)$ $x_1 = 0$

That is, the d.c. component m as the first term after the cos conversion is separated from the vector. The second term and similar terms are normalized by the mean absolute value sum (amplitude) in each term, and equivalently become the cos conversion normalization input vectors (126) in (K − 1) dimensions. The d.c. component (m) and the amplitude component ($\sigma$) (127) are separated. Although one-dimensional cos conversion and the mean absolute value sum as amplitude are used in the embodiment, of course, two-dimensional cos conversion or mean square sum may be used.

The cos conversion normalization input vectors $\underline{X}$ (126) are latched to the normalization input vector register 31 in the vector quantization member 29. The code table address counter 17 sequentially reads the last cos conversion normalization output vectors $y_i$ from the dynamic cos conversion normalization output vector code table 16 by the code table address (130), and latches them to the normalization output vector register 32. The absolute value distortion operation circuit 23 calculates the absolute value distortion $d_i$ using the parallel subtractor 33 and the parallel absolute value calculator 34 as follows:

$$d_i = \sum_{j=1}^{k} |x_j - y_{ij}|$$

(Term of j=1 is unnecessary essentially.)

The minimum distortion detection circuit 20 generates a strobe signal when the absolute value distortion $d_i$ is minimum, and takes the code table address 130 to the index register 18. Content of the index register 18 at one round of the code table address counter 17 becomes the vector quantization index (120). On the other hand, the cos conversion normalization input vectors (126) are accumulated to the vector accumulator 35 per index (120) quantized in the code updating member 30. The index counter 36 counts the number of vectors mapped to each index. Arithmetic mean of the vectors mapped to each index is calculated by the division calculator 37. The mean vector is held to the register 38, and written as the updated cos conversion normalization output vector $y_i$ (129) in the dynamic cos conversion normalization output vector code table 16. The initial content of the dynamic cos conversion normalization output vector code table 16 is picked up from the cos conversion normalization input vector $\underline{X}$ (126).

$$\underline{y_i} = \Sigma(\underline{X}_i / \|\underline{X}\|_i$$

$[\underline{y_i}] = [\underline{y_1}, \underline{y_2}, \ldots \underline{y_N}]$ (updated set)

Wherein, $(\underline{X})_i$ represents input vector $\underline{X}$ quantized in the index i, $\|\underline{X}\|_i$ represents the number of input vectors $\underline{X}$ quantized in the index i, and N represents the number of output vectors. Above-mentioned process is clustering. When the vector quantization index (128), the d.c. component and the amplitude component (127), and the code table are updated, the encoder 26 in FIG. 9 performs encoding together with a set of the updated cos conversion output vectors (129), and outputs them as the encoding member output signals (125).

In the encoding member as shown in FIG. 12, when the vector quantization index (120), the d.c. component and the amplitude component (127), and the code table are updated in the decoder 39, a set of the updated cos conversion normalization output vectors (129) are decoded. The updated cos conversion normalization output vectors 129 are written in the dynamic cos conversion normalization output vector code table 16. The cos conversion normalization output vectors $y_i$ (132) to provide the minimum distortion according to the vector quantization index (120) are latched to the normalization output vector register 32. The normalization restoration inverse cos conversion circuit 40 reproduces the output vectors (133), $S' = \{S'_1, S'_2, \ldots, S'_k\}$ using the d.c. component (m) and the amplitude component ($\sigma$) as follows:

$$S_j = m + \sigma \cdot \sum_{t=2}^{k} y_{ij} \cos\left[\frac{(2t-1)(j-1)}{2K} \pi \right]$$

$(j = 1, 2, \ldots, k)$

Another embodiment will now be described wherein amplitude component is corrected using minimum quantization distortion in order to eliminate mismatching of a vector quantizer.

In FIG. 13, numeral 132 designates input vector, numeral 28 a mean value separation normalization circuit, numeral 133 normalization input vector, numeral 134 mean value component of the input vector 132, numeral 135 amplitude component thereof, numeral 31 a normalization input vector register, numeral 17 a code table address counter, numeral 131 code table address, numeral 16 a normalization output vector code table memory, numeral 32 a normalization output vector register, numeral 33 a parallel subtractor, numeral 34 a parallel absolute value calculator, numeral 23 an absolute value distortion calculation circuit (accumulator), numeral 20 a minimum distortion normalization output vector detection circuit, numeral 136 minimum quantization distortion detected by the minimum distortion normalization output vector detection circuit 20, numeral 137 strobe signal, numeral 18 an index register, numeral 120 vector quantization index, numeral 41 an amplitude correction circuit, numeral 138 corrected amplitude value, numeral 26 an encoder for encoding the vector quantization index, the mean value component and the amplitude component together, and numeral 130 encoding member output signal.

Figure 14:
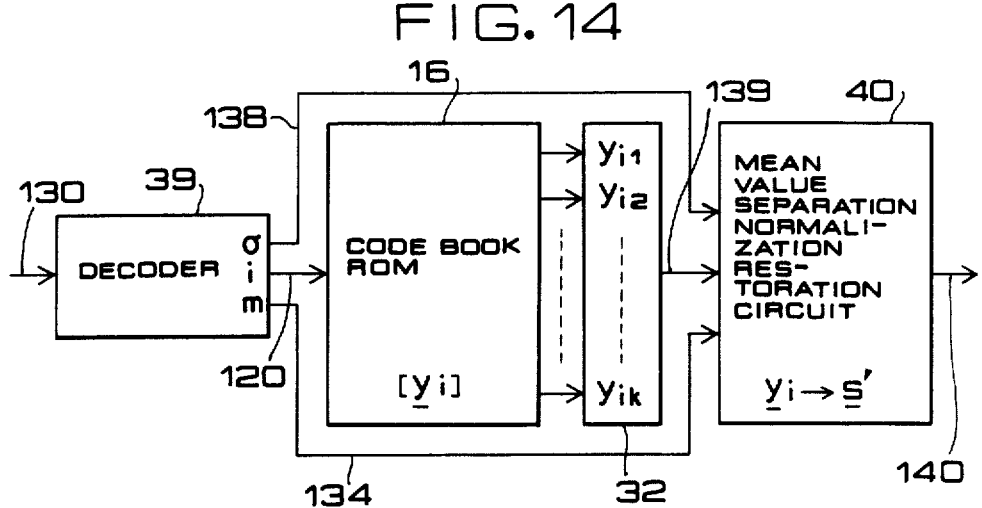
FIG. 14 is a block diagram illustrating constitution of a decoding member as still another embodiment of the invention.

FIG. 14 shows an example of a decoding member. In FIG. 14, numeral 39 designates a decoder for decoding the vector quantization index, the mean value component and the amplitude component, numeral 139 normalization output vector, numeral 40 a mean value separation normalization restoration circuit, and numeral 140 output vector.

Operation of this embodiment will be described. A plurality of input signal series are brought together into input vectors (132), $\underline{S} = \{s_1, s_2, \ldots, s_k\}$ in block form, and the input vectors (132) are separated by the mean value separation normalization circuit 28 into the mean value component (134) and the amplitude component (135), and the normalization input vectors (133), $\underline{X} = \{x_1, x_2, \ldots, x_k\}$ are formed. Assuming that the mean value component (134) be m and the amplitude component (135) be $\sigma$, when the absolute value amplitude is used for example, they are expressed as follows:

$$m = K^{-1} \sum_{j=1}^{k} S_j$$

$$\sigma = K^{-1} \sum_{j=1}^{k} |S_j - m|$$ (absolute value amplitude)

$$x_j = (S_j - m)/\sigma$$

$$(j = 1, 2, \ldots, k)$$

Although the absolute value amplitude is exemplified, $$\sigma = \left[ K^{-1} \sum_{j=1}^{k} (s_j - m) \right]^{\frac{1}{2}}$$
(standard deviation)

$$\sigma = \frac{1}{2} \left[ \max_j (s_j - m) - \min_j (s_j - m) \right]$$
(peak-to-peak value)

or the like, of course, may be used.

Since the input vectors approach definite distribution within the signal space according to the processing of mean value separation and normalization, efficiency of the vector quantization is improved. The normalization input vectors (133) are latched to the normalization input vector register 31. The code table address counter 17 sequentially reads the normalization output vectors yi from the normalization output vector code table memory 16, and latches them to the normalization output vector register 32. The absolute value distortion calculation circuit 23 estimates the distortion di between X and yi from the parallel subtrator 33 and the parallel absolute value calculator 34 as follows:

$$d_i = \sum_{j=1}^{k} |x_j - y_{ij}|$$
(absolute value distortion)

Although the absolute value distortion is exemplified, $$d_i = \sum_{j=1}^{k} (x_j - y_{ij})^2$$
(square distortion)

$$d_i = \max_j |x_j - y_{ij}|$$
(maximum element distortion)

or the like, of course, may be used.

The minimum distortion detector 20 detects the minimum value of the distortion $d_i$ between yi and X read in sequence. That is, the minimum distortion becomes $$d = \min_i d_i$$

When the normalization output vector with the minimum distortion is detected, the strobe signal (137) is transmitted to the index latch 18 and the code table address (131) being address of vector is taken and the minimum quantization distortion (136) min $d_i$ is outputted. At the time of one round of the code table address counter 17, the code table address stored in the index register 18 becomes the vector quantization index (120). The amplitude correction circuit 41 corrects the amplitude component (135) using the minimum quantization distortion (136) according to the strobe signal from the minimum distortion detector 20, and outputs the corrected amplitude value (138). The correction of amplitude is performed in order to minimize the distortion during signal reproduction. For example, when quantization distortion is large, the correction corresponds to multiplication of a factor to the amplitude so as to decrease the amplitude in the reproduction. In this constitution, not only the distortion due to mismatching of the quantizer can be reduced, but also noise component contained in the input signal can be reduced. The amplitude correction circuit 41 may be constituted by a ROM having the minimum quantization distortion (136) and the amplitude component (135) as address input, and therefore the increase of the apparatus scale is quite small. The correction characteristics can be determined previously in that relation between the quantization distortion min $d_i$ and the factor multiplied to the amplitude so as to minimize the distortion during reproduction is processed statistically. When the standard deviation is used in the normalization and the square distortion is used as definition of distortion, the correction characteristics may be specified by numerical expression.

Figure 15:
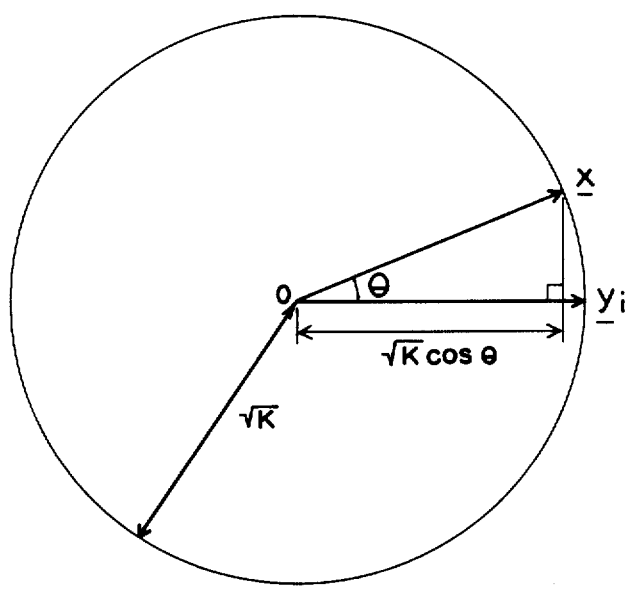
FIG. 15 is a diagram illustrating principle of correction in an embodiment of the invention.

FIG. 15 is a diagram illustrating principle of correction in this embodiment using the standard deviation and the square distortion. In FIG. 15, X designates the normalization input vector, and yi designates the normalization output vector by vector quantization of X. Since both X and yi are subjected to mean value separation normalization, they are on a hypercircumference of radius in $\sqrt{K}$ in K-dimensional space. Angle $\theta$ between the normalization input vector X and the normalization output vector yi corresponds to distortion of both vectors, and has following relation.

$$d_i = 2K(1 - \cos \theta)$$

As clearly seen from FIG. 15, in order to obtain the best approximation of X by multiplying a factor to yi, $\cos \theta$ becomes the optimum factor. Since the above relation is held in similar form also at multiplying the amplitude during reproduction, $\cos \theta$ is multiplied as a factor to the amplitude, thereby the distortion during reproduction can be reduced corresponding to the quantization distortion $d_i$. Since $d_i$ is estimated during the vector quantization, factor $\cos \theta$ is specified as follows:

$$\cos \theta = 1 - \frac{d_i}{2K}$$

Hence, the corrected amplitude value (138) $\sigma'$ is specified as follows:

$$\sigma' = \sigma \left( 1 - \frac{d_i}{2K} \right)$$

The encoder 26 encodes the corrected amplitude value (138) $\sigma'$, the mean value component (134) m and the vector quantization index 120, and outputs them as the encoding member output signal (130).

In the decoding member, the decoder 39 decodes the vector quantization index (120), the mean value component (134) and the corrected amplitude value (138), and reads the normalization output vectors yi from the normalization output vector code table 16 and latches them to the normalization output vector register 32. Further, the mean value separation normalization restoration circuit 40 decodes the output vectors (140), $\underline{S}' = \{s_1', s_2', \ldots, s_k'\}$ using the mean value component (134) and the corrected amplitude value (138). That is, $$s_j' = \sigma \cdot y_{ij} + m$$

$$(j = 1, 2, \ldots, k)$$

When color video input signals are composed of three components, red, green and blue, the vector quantization including color information is not practicable. In order to obtain a versatile set of output vectors to enable model formation for any image, the number of the output vectors will become bulky. Consequently, matrix conversion of the three components is performed into luminance component and color difference component, and then the color difference component is sampled and at the same time the mean value of the luminance component is separated or the mean value of the luminance component and the mean value of the color difference component are separated, thereby the vector of normalization is subjected to vector quantization. In this constitution, a color video quantizer to reduce redundancy of any color video signal is obtained using set of a small number of output vectors and increasing the hardware to the least degree.

An embodiment in such constitution will now be described in detail. In FIG. 16, numerals 141, 142, 143 designate input signal series of R, G and B components respectively, numeral 42 a matrix conversion circuit, numeral 144 luminance Y signal, numerals 145, 146 color difference I and Q signals, numeral 12 a mean value separation circuit, numeral 147 mean value, numeral 148 Y signal after mean value separation, numeral 28 a normalization circuit, numerals 149, 150, 151 Y component, I component and Q component after vector normalization respectively, numeral 152 input vector subjected to luminance mean value separation and normalization, numeral 31 an input vector register, numeral 131 output vector address, numeral 16 an output vector code table, numeral 17 an output vector address counter, numeral 116 normalization output vector, numeral 117 intervector distortion, numeral 119 index strobe signal, numeral 153 index signal, numeral 18 an index register, numeral 135 amplitude value, numeral 120 index of minimum distortion output vector, numeral 26 an encoding circuit, and numeral 130 encoding output signal.

Also in FIG. 17, numeral 39 designates a decoding circuit, numeral 154 output vector address, numeral 156 normalization output vector, numeral 21 an amplitude reproduction circuit, numeral 157 mean value separation $Y_1$ signal, numeral 158 $I_1$ component signal, numeral 159 $Q_1$ component signal, numeral 22 a luminance mean value adding circuit, numeral 160 Y component signal, numeral 43 a matrix reverse conversion circuit, and numerals 161, 162, 163 R, G, B output signal series.

Operation of this embodiment will be described. The description will be performed first referring to an example of matrix conversion shown in FIG. 18.

The R, G, B input signal series 141, 142, 143 are converted by the matrix conversion circuit 42 into the Y component (luminance) and the I, Q components (color difference).

Conversion expressions are as follows:

$$Y = 0.30R + 0.59G + 0.11B$$

$$I = 0.60R - 0.28G - 0.32B$$

$$Q = 0.21R - 0.52G + 0.31B$$

Figure 18:
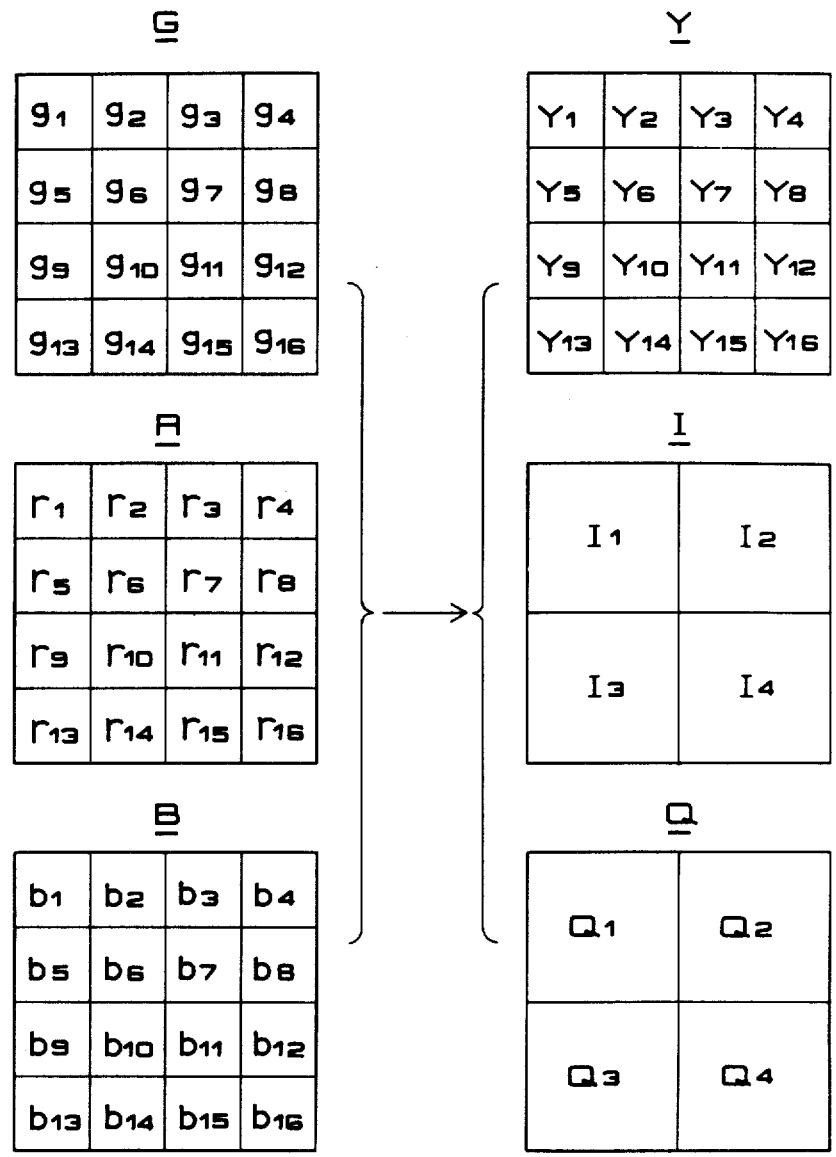
FIG. 18 is a diagram illustrating matrix conversion in the quantizer.

Further, the I, Q components are subsampled. FIG. 18 shows an example of this conversion. In FIG. 18, the R, G, B signals of $4 \times 4$ picture elements are converted into the Y signals of $4 \times 4$ picture elements and the I, Q signals subsampled by the mean values of $2 \times 2$ picture elements. The luminance Y signals (144) obtained by the matrix conversion eliminate the mean values (147) being d.c. component of luminance in the mean value separation circuit 12, and are transferred as the Y signals (148) of mean value separation to the normalization circuit 28.

Assuming that the Y signal after matrix conversion be $Y_j$, the mean value separation Y signal be $y_j$ and the separated mean value be $\mu$, it follows that $$\mu = \frac{1}{16} \sum_{j=1}^{16} Y_j$$

$$Y_j = Y_j - \mu$$

In the normalization circuit 28, the mean value separation Y signals (148) and the color difference I, Q signals (145), (146) are brought together (In the example of FIG. 18, $\underline{Y}$, $\underline{I}$, $\underline{Q}$ are brought together into 24-dimensional vectors.) and the normalization is performed, thereby the amplitude values (135) of the input vectors are separated. Assuming that the vector before normalization be $\underline{s}$, the normalization input vector (152) be $\underline{u}$ and the amplitude value (135) be $\sigma$, it follows that $$\underline{s} = \{y_1, \ldots, y_{16}, I_1, \ldots, I_4, Q_1, \ldots, Q_4\}$$

$$= \{s_1, \ldots, s_{24}\}$$

$$\sigma = \frac{1}{24} \sum_{j=1}^{24} |s_j|$$

$$u_j = s_j / \sigma$$

$$\underline{u} = \{u_1, \ldots, u_{24}\}$$

Although the absolute value amplitude is shown as amplitude, the standard deviation, the peak-to-peak value or the like may be used.

$$\sigma = \left\{ \frac{1}{24} \sum_{j=1}^{24} s_j^2 \right\}^{\frac{1}{2}} \text{; (standard deviation)}$$

$$\sigma = \frac{1}{2} \left\{ \max_j(s_j) - \min_j(s_j) \right\} \text{; (peak-to-peak value)}$$

The Y, I, Q components (149), (150), (151) after normalization are latched to the input vector register 31, and the input vectors (152) subjected to luminance mean value separation and normalization are supplied to the distortion operation circuit. The output vector address counter 17 generates the output vector address 131 so that the output vectors (116) are sequentially read from the output vector code table 16. The distortion operation circuit 23 calculates the intervector distortion between the normalization input vector $\underline{u}$ (152) and the output vector (116) $\underline{v_i}$ from the output vector table 16. Although the absolute value distortion $$d(\underline{u}, \underline{v_i}) = \sum_{j=1}^{24} |u_j - v_{ij}|$$

is used in the distortion calculation, the square distortion, the maximum element distortion or the like as hereinafter described may be used.

$$d(\underline{u}, \underline{v_i}) = \sum_{j=1}^{24} (u_j - v_{ij})^2$$

The minimum distortion detection circuit 20 supervises the intervector distortion (117) outputted from the distortion operation circuit 23, and transmits the index strobe signal (119) to the index register 18 if the minimum distortion is detected. Then, the index signal (153) from the output vector address counter 17 is taken in the index register 18 and stored therein. At the time of one round of the output vector address counter 17, index within the index register 18 becomes the minimum distortion output vector index (120) and is transmitted to the encoding circuit 26.

The encoding circuit 26 encodes the minimum distortion output vector index (120) together with the mean value (147) and the amplitude value (135), and outputs the encoding output signal (130) to be transmitted or recorded.

Subsequently in the encoder of FIG. 17, the encoding output signal (130) enters the decoding circuit 39, thereby the output vector index (120), the mean value (147) and the amplitude value (135) are decoded. The minimum distortion output vector index (120) is converted by the index register 18 into the output vector address (154), and the normalization output vectors (156) $v_i$ are read from the output vector code table 16.

$$\underline{v_i} = \{v_{i1}, \ldots, v_{i24}\}$$

The normalization output vectors (156) are multiplied by the amplitude value (135) in the amplitude reproduction circuit 21, and then the mean value (147) is added to only the mean value separation Y component signal (157) in the mean value adding circuit 22.

$$s'_j = v_j \times \sigma$$

$$\underline{s'} = \{s'_1, \ldots, s'_{24}\}$$

$$= \{y'_1, \ldots, y'_{16}, I'_1, \ldots, I'_4, Q'_1, \ldots, Q'_4\}$$

$$Y_j = y'_j + \mu$$

The $Y_1$ component signals (160) subjected to amplitude reproduction and mean value adding and the $I_1$, $Q_1$ component signals (158), (159) after amplitude reproduction are reverse-converted by the matrix reverse conversion circuit 43 into the R, G, B output signal series (161), (162), (163).

Although only the Y signal component of the input vector is subjected to the mean value separation in the above embodiment, method of mean value separation is not limited to this, but the mean value of the combined component of the I component and the Q component may be separated independently of the mean value of the Y component and subjected to amplitude normalization.

Although the Y, I, Q signals are obtained from the R, G, B signals by the matrix conversion circuit in the above embodiment, the Y, R−Y, B−Y signals may be used in place of the Y, I, Q signals.

When the color video signals are subjected to the color video difference vector quantization, accumulation of vector quantization noises between the color video signals in the encoding loop may be mutually affected and not averaged, resulting in the significant color shift trailing at the image variation point.

Consequently, each reproduction color video signal after encoding is multiplied by a prediction coefficient utilizing correlation between channels so as to form a color video prediction signal of each channel, thereby the vector quantization noise is smoothed throughout each channel and accumulation of noise in the encoding loop is prevented. In this constitution, a color image efficient encoding apparatus to improve the color reproducibility in region of significant color variation can be obtained without deteriorating the encoding efficiency.

Figure 19:
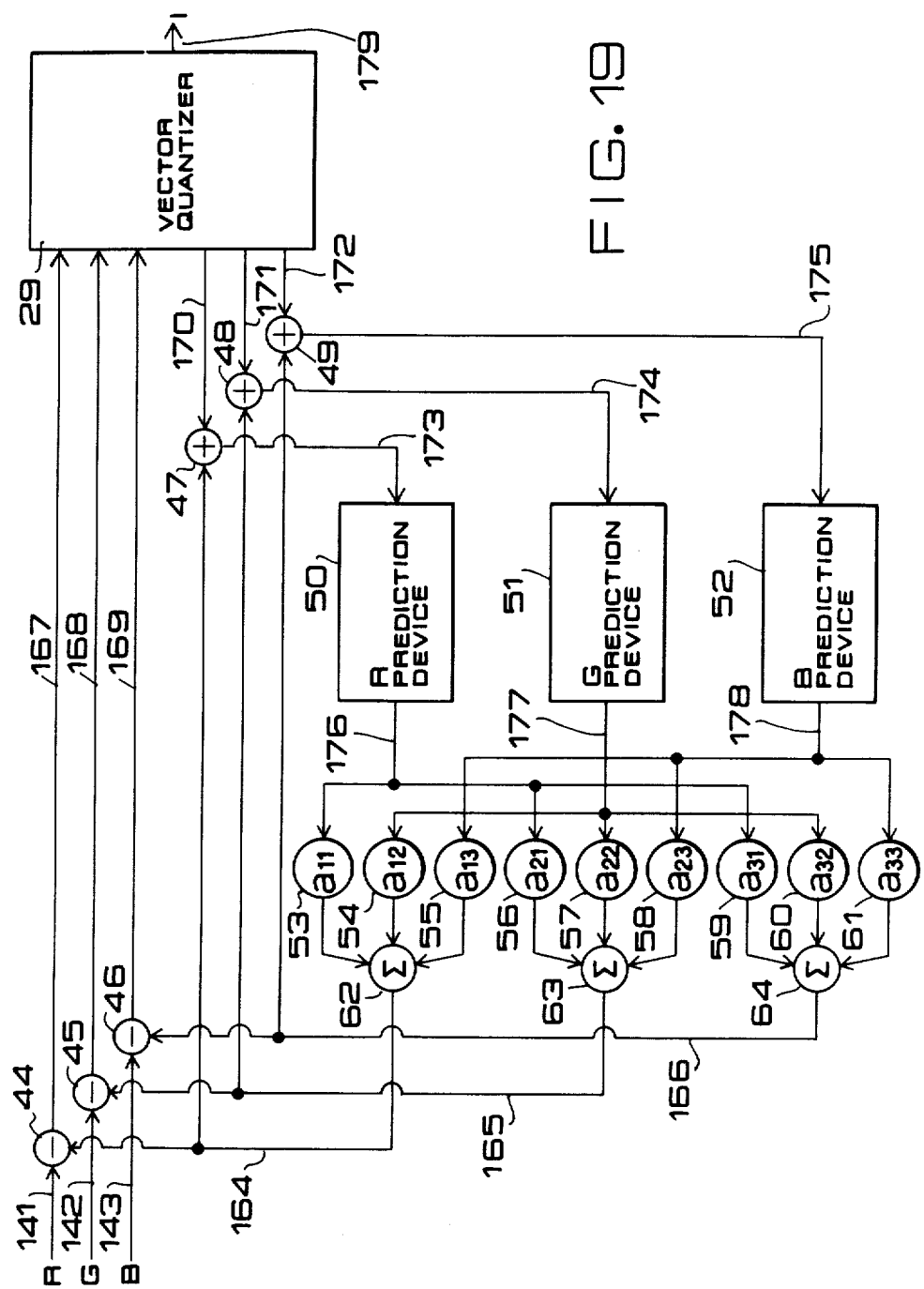
FIG. 19 is a constitution diagram of an encoding member of a color image efficient encoding apparatus as another embodiment of the invention.

An embodiment in such constitution will now be described. In FIG. 19, numerals 44, 45 and 46 designate subtractors for subtracting color video prediction signals from color video input signals composed of the three components, R, G and B, per each component, and outputting the color video difference signals respectively, numeral 29 a vector quantizer for bringing together the color video difference signals of the three components into vector quantization in the three-dimensional signal space and outputting the color video difference vector quantization signals and the vector quantization index, numerals 47, 48 and 49 adders for adding the color video difference vector quantization signals to the color video prediction signals per each component and obtaining the color video reproduction signals respectively, and numerals 50, 51 and 52 R, G and B prediction devices for forming the color image prediction signals per each component from the color video reproduction signal series respectively.

Numerals 53 through 61 designate multipliers for multiplying the interchannel prediction coefficients of each color video signal respectively, and numerals 62, 63 and 64 accumulators of signals of the multiplied interchannel prediction coefficients of the prediction devices 50, 51 and 52 of each color video signal per each channel respectively.

Regarding the color video input signals of red, green and blue, assume that the red video input signal (141) be R(l), the green video input signal (142) be G(l) and the blue video input signal (143) be B(l). Wherein l=1, 2, . . . designates the time series number of each signal. Then, assume that the color video correlation prediction signals (164), (165) and (166) of the red, green and blue channels be $P^*_R(l)$, $P^*_G(l)$ and $P^*_B(l)$ respectively, the color video difference signals (167), (168) and (169) obtained by subtracting the color video correlation prediction signals from the color video input signals through the subtractors 44, 45 and 46 per each channel be $\varepsilon R(l)$, $\varepsilon G(l)$ and $\varepsilon B(l)$ respectively, and the color video vector quantization signals (170), (171) and (172) obtained in the vector quantization of the three signals $\varepsilon R(l)$, $\varepsilon G(l)$ and $\varepsilon B(l)$ by the vector quantizer 29 in the three-dimensional signal space $S^3$ be $\hat{\varepsilon}R(l)$ and $\hat{\varepsilon}G(l)$ and $\hat{\varepsilon}B(l)$. Also assume that the color video reproduction signals (173), (174) and (175) obtained by adding the color video vector signals to the color video correlation prediction signals per each channel be R(l), G(l) and B(l) respectively, and the color video prediction signals (176), (177) and (178) formed in multiplication of prescribed coefficients by the R prediction device 50, the G prediction device 51 and the B prediction device 52 utilizing correlation of the color video signal series per each channel based on the color video reproduction signal series be $P_R(l)$, $P_G(l)$ and $P_B(l)$ respectively.

Then, the encoding member shown in FIG. 19 executes the operational processing as follows:

$$\epsilon_R(l) = R(l) - P_R^*(l), \hat{\epsilon}_R(l) = \epsilon_R(l) + Q_R^*(l)$$

$$\epsilon_G(l) = G(l) - P_G^*(l), \hat{\epsilon}_G(l) = \epsilon_G(l) + Q_G^*(l)$$

$$\epsilon_B(l) = B(l) - P_B^*(l), \hat{\epsilon}_B(l) = \epsilon_B(l) + Q_B^*(l)$$

$$\hat{R}(l) = P_R^*(l) + \hat{\epsilon}_R(l) = R(l) + Q_R^*(l)$$

$$\hat{G}(l) = P_G^*(l) + \hat{\epsilon}_G(l) = G(l) + Q_G^*(l)$$

$$\hat{B}(l) = P_B^*(l) + \hat{\epsilon}_B(l) = B(l) + Q_B^*(l)$$

$$P_R(l) = C_R \cdot \hat{R}(l-1)$$

$$P_G(l) = C_G \cdot \hat{G}(l-1)$$

$$P_B(l) = C_B \cdot \hat{B}(l-1)$$

$$P_R^*(l) = a_{11} \cdot P_R(l) + a_{12} \cdot P_G(l) + a_{13} \cdot P_B(l)$$

$$P_G^*(l) = a_{21} \cdot P_R(l) + a_{22} \cdot P_G(l) + a_{23} \cdot P_B(l)$$

$$P_B^*(l) = a_{31} \cdot P_R(l) + a_{32} \cdot P_G(l) + a_{33} \cdot P_B(l)$$

Wherein, a11, a12, a13, a21, a22, a23, a31, a32, a33 are the interchannel prediction coefficients derived from the correlation between the color video signals. The coefficients preferably hold relation as follows:

$$a_{11} + a_{12} + a_{13} \leq 1, a_{21} + a_{22} + a_{23} \leq 1$$

$$a_{31} + a_{32} + a_{33} \leq 1$$

Means for forming the color video correlation prediction signals per each channel by multiplying the coefficients corresponding to the correlation in the color signals between the adjacent picture elements according to the embodiment, can smooth the vector quantization noises generated by the vector quantizer 29 and prevent the accumulation propagation in the encoding loop. That is, $$\sum_l [Q_R^*(l)^2 + Q_G^*(l)^2 + Q_B^*(l)] < \sum_l [Q_R^*(l)^2 + Q_G^*(l)^2 + Q_B^*(l)^2]$$

The vector quantization is performed in procedure as hereinafter described. The color video difference signals $\epsilon^R(l)$, $\epsilon_G(l)$ and $\epsilon_B(l)$ in the three-dimensional signal space $S^3$ are brought together into the input vector $\underline{x}_e$. Set of the output vectors $\underline{y_j}$ (j=1, 2, ..., N) of N in number to map the input vector are prepared, and the output vector to minimize the distance d $(\underline{x}, \underline{y_j})$ between the input vector $\underline{x}$ and the output vector is selected and outputted as the color video vector quantization signals $\epsilon_R(l)$, $\epsilon_G(l)$ and $\epsilon_B(l)$. The index i of the output vector $\underline{y_i}$ to provide the minimum distortion is transmitted as the encoding data (130) to the decoding member. Assuming that the vector quantization processing be VQ, it follows that $$\underline{x}_l = (x_1, x_2, x_3)_l = (\epsilon_R(l), \epsilon_G(l), \epsilon_B(l))$$

$$\underline{y_j} = (y_{j1}, y_{j2}, y_{j3})$$

$$d(\underline{x_l}, \underline{y_j}) = \sum_{k=1}^{3} (x_k - y_{jk})$$

$$VQ: \underline{x_l} \rightarrow \underline{y_i} \text{ if } d(\underline{x_l}, \underline{y_i}) < d(\underline{x_l}, \underline{y_j})$$

for all j $$\underline{y_i} = (y_{i1}, y_{i2}, y_{i3}) = (\hat{\epsilon}_R(l), \hat{\epsilon}_G(l), \hat{\epsilon}_B(l))$$

Thereby the color video difference vector quantization signals are obtained, and the encoding data is outputted to the decoding member.

Figure 20:
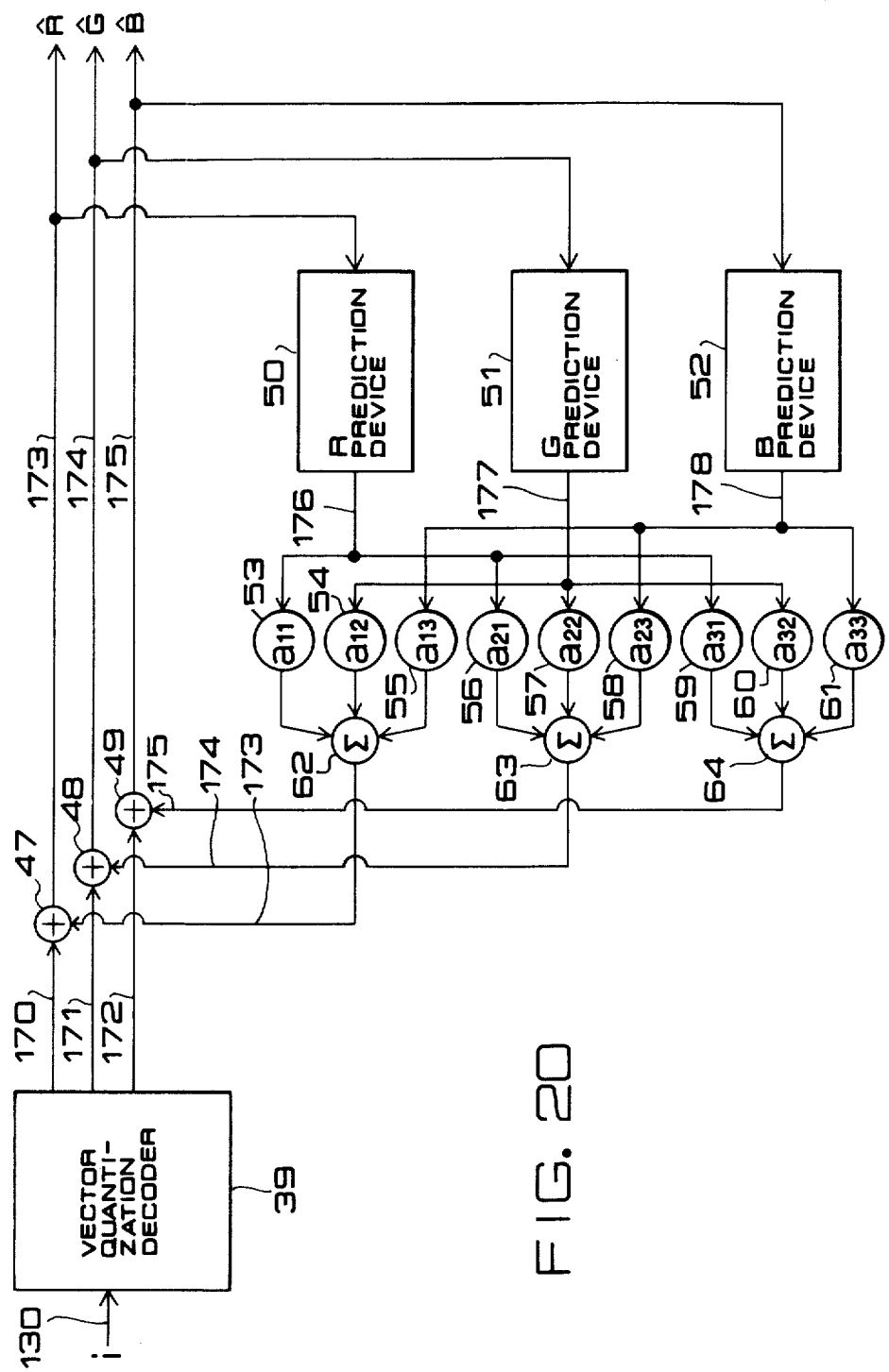
FIG. 20 is a constitution diagram of a decoding member of a color image efficient encoding apparatus as another embodiment of the invention.

Operation of the decoding member as shown in FIG. 20 is performed in that the encoding data (130) of the vector quantizer 29 is received and converted by the vector quantization decoder 39 into the color video difference vector quantization signals (170), (171) and (172) and then the same processing as that of the adding loop in the encoding member shown in FIG. 19 is performed thereby the color video reproduction signals $\hat{R}(l)$, $\hat{G}(l)$ and $\hat{B}(l)$ are obtained. These are improved as shown in the encoding member because the quantization noise is reduced in comparison to the prior art.

Although the above embodiment does not include the case of the intraframe prediction encoding or the adaptive control of the prediction device and the vector quantizer, of course, the invention may be applied to the intraframe or interframe prediction encoding and further to the adaptive changing control of characteristics of the prediction device and the vector quantizer.

Although the efficient encoding of the color video signals of red, green and blue is described in the embodiment, the invention can be applied also to the color video signals in combination of the luminance signal and two color difference signals.

Still another embodiment of the invention will be described referring to the accompanying drawings, wherein matching of the timing of the video frame is performed between the transmission and receiving sides without transmitting the top end position information of the video frame and the clock information of decoding to the receiving side, thereby the transmission control system and the control of the transmission and receiving buffers for the speed smoothing can be made easy.

Figure 21:
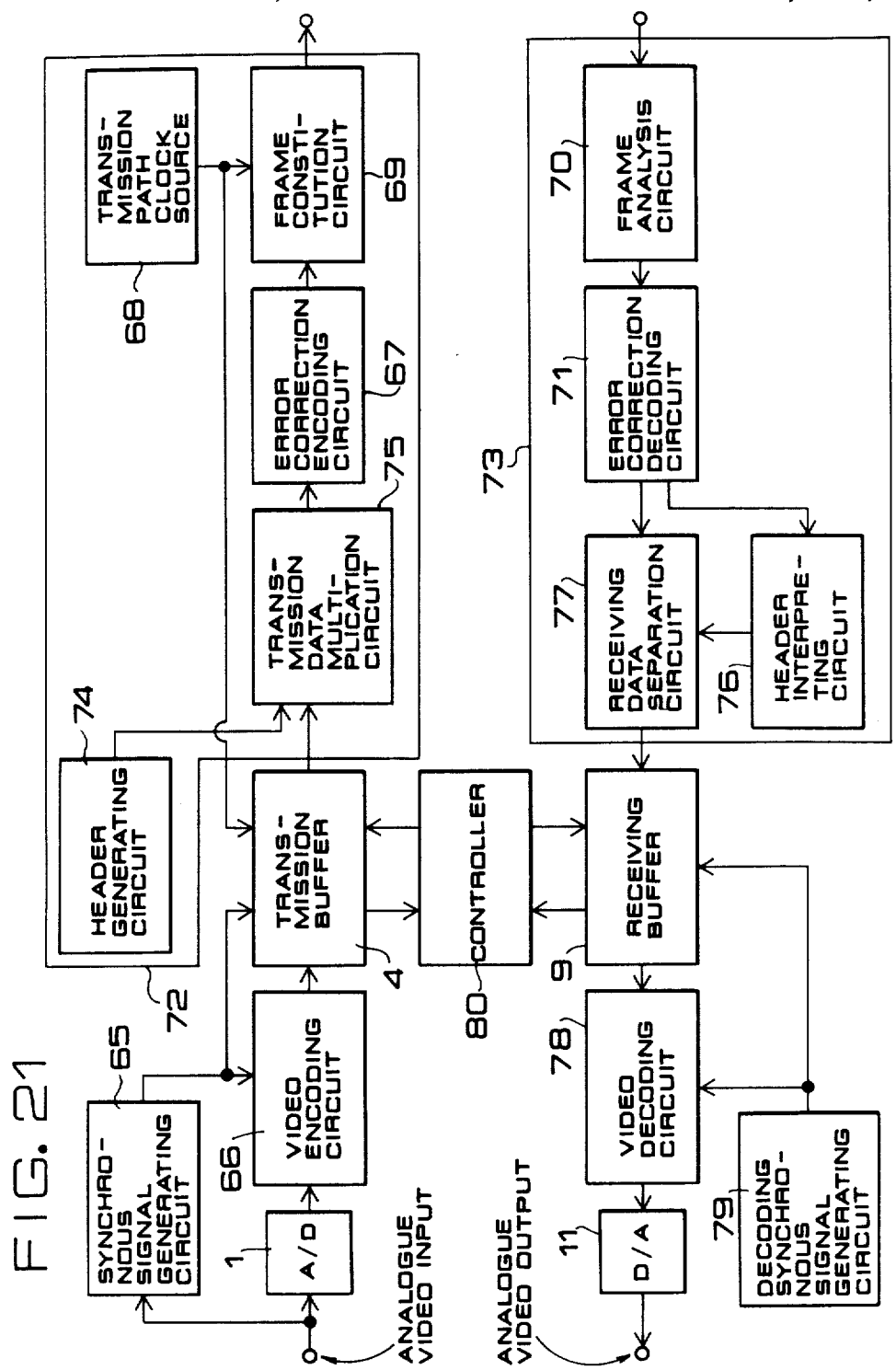
FIG. 21 is a constitution diagram of a video encoding transmission apparatus as another embodiment of the invention.
Figure 22:
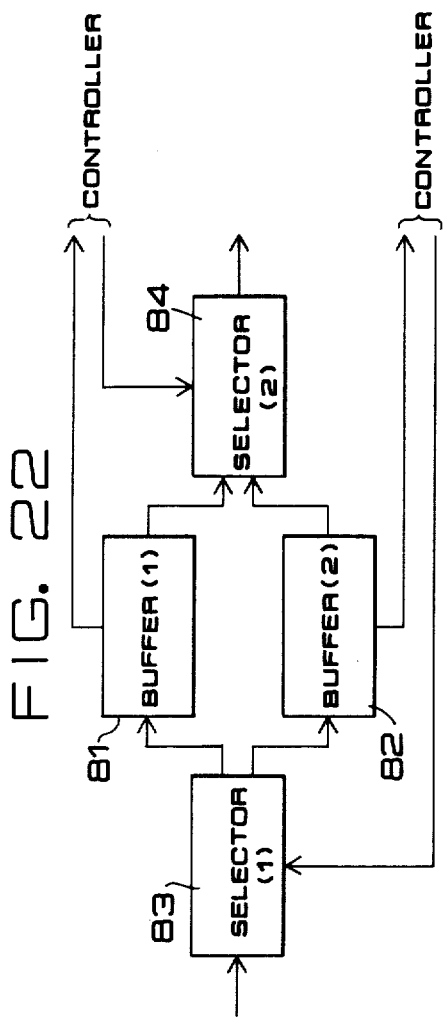
FIG. 22 is a constitution diagram of a transmission/receiving buffer used in the video encoding transmission apparatus.

In FIG. 21, numeral 1 designates an A/D converter where inputted analog video signals are converted into digital data, numeral 65 a synchronous signal generating circuit for generating clocks required for the encoding such as video frame pulse or line pulse from the analog video signals, numeral 66 a video encoding circuit for converting the A/D converter output signal into the encoding data using efficient encoding method, numeral 67 an error correction encoding circuit for applying the error correction encoding to the encoding data transmitted from the buffer memory, numeral 68 a transmission path clock source for outputting clocks to transmit the data onto the transmission path at prescribed speed, numeral 69 a frame constitution circuit to constitute the transmission frame for transmitting data together per prescribed time slot in synchronization with the clocks of the transmission path, numeral 70 a frame analysis circuit where data of the transmission frame transmitted through the transmission path are analysed and converted into the encoding data train, numeral 71 an error correction decoding circuit for correcting the error in the reverse processing to that of the error correction encoding circuit, numeral 11 a D/A converter where the digital data decoded by the video decoding circuit is converted into analog video signals and then outputted, numeral 72 a transmission control member at transmission side, and numeral 73 a transmission control member at receiving side. Numeral 74 designates a header generating circuit for generating a header to discriminate the transmitted data frame, numeral 4 a transmission buffer where data taken per one video frame and encoded in the video encoding circuit are stored according to command of a controller and transmitted at prescribed transmission speed, numeral 75 a transmission data multiplication circuit for performing multiplication of the encoding data transmitted from the transmission buffer and other data such as the header, numeral 76 a header interpreting circuit for interpreting the header of the transmitted data frame, numeral 77 a receiving data separation circuit for separating the encoding data and the voice data, numeral 9 a receiving buffer where received encoding data are stored and supplied sequentially to the video decoding circuit 78 according to command of the controller, numeral 79 a decoding synchronous signal generating circuit for generating various clocks to perform the decoding action in asynchronous state to the transmission side, and numeral 80 a controller for controlling the buffers at transmission and receiving sides. In FIG. 22, numerals 81, 82 designate buffers 1, 2 having the same capacity, and numerals 83, 84 designate selectors 1, 2 for performing the action changing of the buffers.

Figure 23:
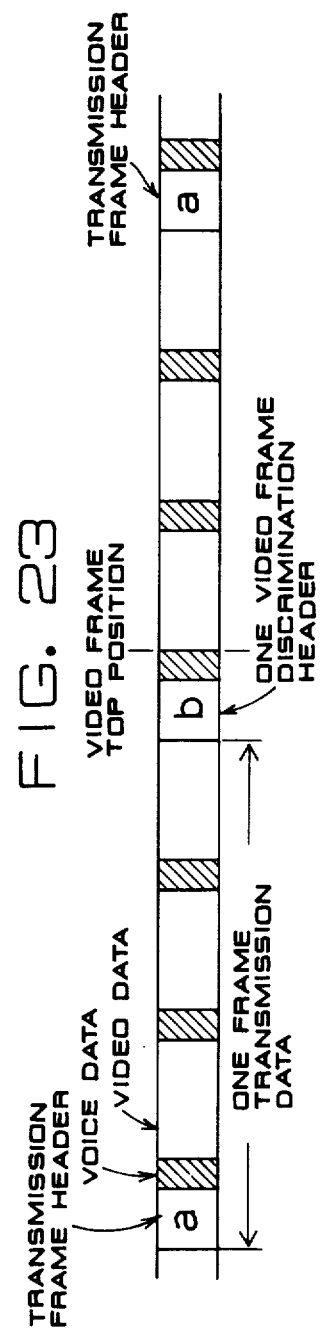
FIG. 23 is a constitution diagram illustrating an example of a transmission frame with header.

Operation of this embodiment will be described. Digital data outputted from the A/D converter 1 are taken per every other video frame, and then encoded in the video encoding circuit 66 by efficient encoding method with the encoding speed being not constant, such as interframe encoding, and supplied to the transmission buffer 4. The transmission buffer is a double buffer for performing read/write actions simultaneously, and is constituted as shown in FIG. 22. The buffers 1, 2 are changed in the input/output states by the selectors 1, 2 according to control from the controller 80, and at the same time supply the existing data storage amount to the controller. The header generating circuit 74 is a circuit to generate header information of the transmission data frame. If the encoding data of the top end position of the video frame is transmitted to the transmission data multiplication circuit, the header generating circuit 74 outputs the specific data indicating the top end position of the video frame. The header information is multiplied together with the encoding data, the voice data or the like in the transmission data multiplication circuit 75. After adding the error correction code, the frame synchronous pattern is inserted in the frame constitution circuit 69, and the arrangement changing of the data train is performed, thereby the transmission frame is constituted. A constitution example of the transmission frame with header is shown in FIG. 23.

The receiving data train transmitted through the digital transmission path is changed in the arrangement by the frame analysis circuit 70 in synchronization with the frame synchronous pattern in the reverse processing to that as above described. After the error correction in the error correction decoding circuit 71, the header is separated. The header is discriminated by the header interpreting circuit 76, and the voice data is separated in the receiving data separation circuit 77 corresponding to constitution of the data frame and the encoding data is transmitted to the receiving buffer. In the receiving buffer 9, the encoding data from the data frame indicating the top end of the video frame discriminated by the one video frame discrimination header to next similar data frame are stored. The encoding data are transmitted to the video decoding circuit 78 in synchronization with the video pulse supplied from the decoding synchronous signal generating circuit 79. The decoding processing is performed using clocks supplied from the decoding synchronous signal generating circuit, and the data is converted into analog video signals in the D/A converter 11 and reproduced and outputted.

Figure 24:
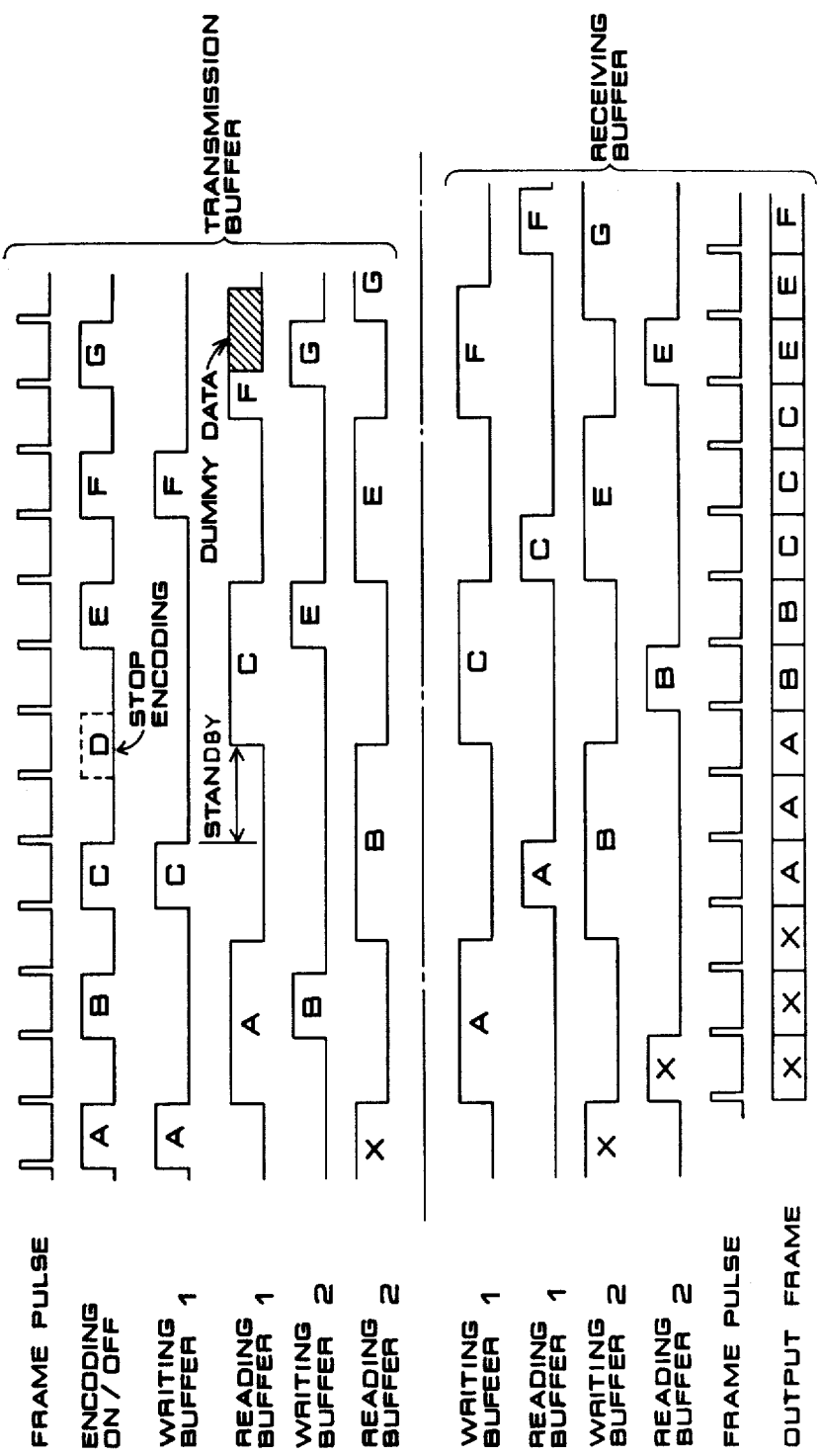
FIG. 24 is a timing chart illustrating operation of a transmission/receiving buffer.

Relation between operation of the transmission and receiving buffers and the transmission and receiving video frames will be described referring to FIG. 24. The transmission and receiving buffers take constitution in FIG. 22. At the transmission side, the controller supervises whether the buffers 1, 2 are empty or not according to the storage amount from the buffers 1, 2, and supplies the control signal of write/read depending on state of each buffer. Assume that the buffer 1 is empty. The encoding data of the frame A is written to the buffer 1 in synchronization with the encoding ON/OFF signal varying at the timing of frame pulse of every other frame. At this time, the buffer 2 reads the frame X. If the writing of the buffer 1 and the reading of the buffer 2 are finished, the buffer 1 immediately starts the reading of the frame A and the buffer 2 writes the frame B in synchronization with next encoding ON signal. Subsequently, the reading and writing operation is repeated in similar sequence. Even if the writing of the buffer 1 is finished (frame C in the figure), while the reading of the buffer continues (frame B in the figure), the reading of the frame C of the buffer 1 becomes standby and since the buffer 2 is not empty it cannot write and the frame D is stopped in encoding. On the contrary, even if the reading of the buffer 1 is finished (frame F in the figure), while the writing of the buffer 2 is not finished (frame G in the figure), until the writing of the buffer 2 is finished, the buffer 1 reads the dummy data and outputs it as idle transmission frame. According to above procedure, the transmission is performed without stopping the reading operation of the buffers 1, 2.

At the receiving side, the writing operation of the buffers 1, 2 is changed alternately and continuously. If the writing is finished, the buffer immediately performs the reading in synchronization with the frame pulse generated in asynchronous state to the transmission side. Until the writing of another buffer is finished, the video frame read just before this and decoded is repeatedly outputted in synchronization with the frame pulse, thereby the transmission delay amount of the video frame is adjusted.

In this embodiment, the data frame may be constituted in multiplication of the control data by increasing the header information.

In the input signals of the video encoding circuit, every other frame may be taken.

Although the invention can be utilized in a motion picture transmission apparatus for teleconferencing system, it may be applied widely to transmission of motion picture for television without being limited to the teleconferencing system.

What is claimed is:

1. An interframe adaptive vector quantization apparatus comprising:
 a frame memory for storing at least one frame of video signals normally;

a subtractor where, when input signal series of K in number (K: integer) are brought together into a block and the last video signal series is inputted, prediction signal series in a block at position corresponding to the same position as the previous block at least one frame before the previous signal series on the screen is read from the frame memory and the interframe difference signal series is calculated;

a mean value separation circuit for estimating intrablock mean value of the interframe difference signal series and converting it into input vector by the mean value separation;

a vector quantization encoding member for encoding the input vector into discrimination code of the output vector to maximize total sum of products of elements of the input and output vectors, i.e., the inner product, among a plurality of sets of the output vectors optimized by clustering method in the poly-dimensional space based on statistical properties of normalization vectors by the normalization of the input vectors by the intrablock standard deviation;

a movement detection circuit for executing processing that a block having amplitude coefficient as the total sum of products and the intrablock mean value both being less than prescribed threshold value is made insignificant block and the intrablock picture element values of the interframe difference signal series are made all zero;

a vector quantization decoding member for selecting output vector among the output vector discrimination code corresponding to the significant blocks other than the insignificant blocks and reproducing the interframe difference signal series by multiplication of the amplitude coefficient and adding of the mean value and making the interframe difference signal series to be zero for the insignificant block;

an adder for adding the interframe difference signal series reproduced after the vector quantization to the prediction signal series and reproducing the video signal and writing the video signal to the frame memory; and a transmission data buffer for performing the variable length encoding of the significance/insignificance block discrimination code, the output vector discrimination code, the block mean value and the amplitude coefficient and controlling the threshold value to make the information generating amount constant.

2. An interframe adaptive vector quantization encoding apparatus as set forth in claim 1, wherein when the output vector to maximize the total sum of products of elements of input and output vectors is retrieved in the vector quantization encoding member, set of the output vectors are arranged in tree structure, total sum of products of elements of two output vectors and input vector in each branch is calculated, and vector having larger total sum of products is selected in sequence from upper stage to lower stage of the tree structure.

3. An interframe adaptive vector quantization encoding apparatus as set forth in claim 1, further comprising:
means for eliminating redundancy component of the mean value and the amplitude coefficient in the encoding member and the decoding member using differential PCM encoding (hereinafter referred to as "DPCM encoding") and then converting the mean value and the amplitude coefficient of the DPCM encoding into prescribed codes utilizing variable encoding; and means for obtaining the mean value and the amplitude coefficient of the DPCM encoding among the prescribed codes as output of the encoding circuit and then decoding and reproducing the mean value and the amplitude coefficient using the DPCM decoding method.

4. An interframe adaptive vector quantization decoding apparatus as set forth in claim 1, the vector quantization encoding member comprises a normalization output vector code table memory for storing set of mean value separation normalization output vectors specified to provide the minimum distortion previously to the normalization input vector by mean value separation normalization, an absolute value distortion calculation circuit for calculating distortion between the normalization input vector and the normalization output vectors read in sequence from the normalization output vector code table and subjected to the mean value separation, a minimum distortion normalization output vector detection circuit for detecting the minimum distortion among the distortions and determining index of the normalization output vector to provide the minimum distortion, an amplitude correction circuit for correcting the normalization constant calculated in the mean value separation normalization circuit referring to the minimum distortion so that distortion between the output vectors by the amplitude reproduction and the mean value adding to the normalization output to provide said minimum distortion and the input vector becomes minimum, and an encoding member for encoding the mean value component of the input vector, the corrected amplitude value and the vector quantization index to provide the minimum distortion, and the vector quantization decoding member comprises a decoder for decoding the output of the encoding member and obtaining index of the normalization output vector to provide the minimum distortion, the mean value and the corrected amplitude value, and a decoding member for performing the amplitude adding and the mean value adding to the normalization output vector which is read from the normalization output vector code table memory according to the decoded index and subjected to the mean value separation, using the decoded mean value component and the corrected amplitude value so as to obtain the reproduction output vector.

5. An interframe adaptive vector quantization encoding apparatus as set forth in claim 1, wherein the mean value separation circuit is cos conversion normalization member for performing cos conversion of the input vector and separating the d.c. component and normalizing the amplitude of the a.c. component so as to obtain the cos conversion normalization input vector, and the vector quantization encoding member comprises a vector quantization member including a first code table memory to enable rewriting of content of the cos conversion normalization input vector dynamically for selecting the cos conversion normalization output vector to provide the minimum distortion to the cos conversion normalization input vector among set of the cos conversion output vectors stored in the first code table memory and outputting the vector quantization index of the cos conversion normalization output vector, a code table updating member for performing vector adding averaging of the cos conversion normalization input vector group quantized to the same index in the vector quantization member and writing it as set of the updated cos conversion normalization output vectors in the first code table memory, and an encoder for encoding the updated cos conversion normalization output vectors, the vector quantization index obtained in the vector quantization member using the set, the d.c. component and the amplitude and transmitting them, and the vector quantization decoding member comprises a decoder for decoding the encoding member output signals transmitted from the encoder, a second code table memory which can write the set of the updated cos conversion normalization output vectors, and a normalization restoration inverse cos conversion circuit for multiplying the amplitude component decoded by the decoder to the cos conversion normalization output vectors read from the second code table memory according to the vector quantization index decoded by the decoder and adding the d.c. component decoded and performing the inverse cos conversion so as to reproduce the output vectors.

6. An interframe adaptive vector quantization encoding apparatus as set forth in claim 1, wherein the subtractor performs subtraction of color video correlation prediction signal formed from the color video input signal series composed of three components utilizing the color video reproduction signal series already encoded per each channel and outputs each color video difference signal, the vector quantization encoding member is provided with a vector quantizer which brings together the color video difference signals of K in number (K: integer being not less than 3) and performs the vector quantization of the vectors at K-dimensional signal space and outputs the output vector to provide the minimum distortion to the input vector and the index thereof, the adder addes the output vector to provide the minimum distortion as the color video vector quantization signal to the color video correlation prediction signal per each channel so as to obtain each color video reproduction signal, and the color video correlation prediction signal is obtained from the color video signal prediction device which performs multiplication of each color video signal prediction coefficient and each prediction coefficient between color video signals to the encoded signal series of each color video reproduction signal based on correlation not only between adjacent picture elements but also between various color channel picture elements.

7. An interframe adaptive vector quantization encoding apparatus as set forth in claim 1, wherein a matrix conversion circuit converts the color video input signal composed of three elements into luminance component and color difference component, a mean value separation circuit separates one or plural mean values among input vectors obtained by block formation of the luminous component and the color difference component throughout plural picture elements and normalizes amplitude of the output signals so as to obtain the mean value separation normalization vector, the vector quantization encoding member comprises an input vector register for storing each signal component after the vector normalization, a distortion calculation circuit for taking output signal of the output vector control table which previously stores mean value separation normalization output vector group specified to provide the minimum distortion to the output of the input vector register so as to output the mean value separation normalization output vector group, and thereby the distortion calculation circuit calculating the distortion, a minimum distortion detection circuit for detecting the minimum distortion among the distortions, and an index latch using the mean value outputted from the mean value separation circuit, the amplitude value outputted from the normalization circuit and the index strobe signal from the minimum distortion detection circuit as input and providing index of the minimum distortion vector outputted through the index register, and the vector quantization decoding member comprises an output vector address counter for supplying address signal to the output vector code table and index signal to the register, an amplitude reproduction circuit for decoding the encoding signal of the encoding circuit and obtaining the index of the mean value separation normalization output vector to provide the minimum distortion and the mean value and the amplitude value and performing the amplitude reproduction to the mean value separation normalization output vector decoded by the output vector code table using the decoded amplitude value, a mean value adding circuit for performing the mean value adding to the output of the amplitude reproduction circuit using the decoded mean value, and a matrix reverse conversion circuit for performing the matrix reverse conversion of the output of the mean value adding circuit composed of the luminance component and the color difference component into components of red, green and blue.

8. An interframe adaptive vector quantization encoding apparatus as set forth in claim 7, wherein the mean value separation of only the luminance component is performed in the mean value separation circuit.

9. A video encoding transmission apparatus comprising:

a video encoding circuit for inputting video signal and performing A/D conversion of the signal and then applying efficient video encoding processing per frame to digital video data taken per every other video frame;

a transmission buffer constituted by a double buffer to enable simultaneous write/read, for storing one video frame of variable length encoding data with the information generating amount as the video encoding circuit output being not constant and outputting the encoding data at constant speed by the speed smoothing;

a transmission control member at transmission side for performing the transmission framing to enable discrimination per one frame unit to the encoding data transmitted from the transmission buffer and transmitting the encoding data from the transmission buffer to the digital transmission path at constant speed;

a transmission control member at receiving side for receiving the encoded data transmitted from the digital transmission path;

a receiving buffer constituted by a double buffer to enable simultaneous write/read, for storing one frame of encoding data among the receiving data supplied from the transmission control member at receiving side and outputting one video frame of the encoding data at speed being different from the inputting state using synchronous signal supplied from a synchronous signal generating circuit at decoding side as hereinafter described;

a synchronous signal generating circuit at decoding side for generating various clocks required for the decoding action at asynchronous state to the transmission side;

a video decoding circuit for performing decoding of one video frame of the encoding data using the decoding clock supplied from the synchronous signal generating circuit at decoding side; and a controller for controlling the input/output operation of the transmission buffer and the receiving buffer.

* * * * *

UNITED STATES PATENT AND TRADEMARK OFFICE
CERTIFICATE OF CORRECTION

PATENT NO. : 4,710,812

DATED : December 1, 1987

INVENTOR(S) : Tokumichi Murakami et al.

It is certified that error appears in the above-identified patent and that said Letters Patent is hereby corrected as shown below:

On the Title Page, Item [22]

The filing date of "Feb. 28, 1986" should be --Feb. 27, 1986--.

Signed and Sealed this

Fourteenth Day of June, 1988

Attest:

DONALD J. QUIGG

*Attesting Officer*      *Commissioner of Patents and Trademarks*